US010423594B2

(12) United States Patent
Olivier et al.

(10) Patent No.: US 10,423,594 B2
(45) Date of Patent: Sep. 24, 2019

(54) SYSTEMS AND METHODS FOR INDEXING SOURCE CODE IN A SEARCH ENGINE

(71) Applicant: ATLASSIAN PTY LTD, Sydney (AU)

(72) Inventors: Charles Olivier, Neutral Bay (AU); Brent Plump, Woolloomooloo (AU); Stefan Saasen, Fairlight (AU); Robin Stocker, Stanmore (AU)

(73) Assignee: ATLASSIAN PTY LTD, Sydney, New South Wales (AU)

( * ) Notice: Subject to any disclaimer, the term of this patent is extended or adjusted under 35 U.S.C. 154(b) by 0 days.

(21) Appl. No.: 15/362,626

(22) Filed: Nov. 28, 2016

(65) Prior Publication Data
US 2018/0150487 A1 May 31, 2018

(51) Int. Cl.
G06F 16/22 (2019.01)
G06F 8/36 (2018.01)
G06F 16/951 (2019.01)
G06F 8/71 (2018.01)

(52) U.S. Cl.
CPC .............. G06F 16/22 (2019.01); G06F 8/36 (2013.01); G06F 8/71 (2013.01); G06F 16/951 (2019.01)

(58) Field of Classification Search
CPC . G06F 17/30312; G06F 8/36; G06F 17/30864
See application file for complete search history.

(56) References Cited

U.S. PATENT DOCUMENTS

| 7,631,294 | B2 | 12/2009 | Rush | |
| 7,761,456 | B1 | 7/2010 | Cram | |
| 8,856,089 | B1* | 10/2014 | Briggs | G06F 17/30351 707/695 |
| 2005/0262056 | A1* | 11/2005 | Hamzy | G06F 8/36 |
| 2007/0130142 | A1* | 6/2007 | Daum | G06F 9/52 |
| 2007/0299825 | A1 | 12/2007 | Rush | |
| 2010/0106705 | A1 | 4/2010 | Rush | |
| 2010/0199078 | A1* | 8/2010 | Shih | G06F 8/65 713/2 |
| 2011/0231702 | A1* | 9/2011 | Allen | G06F 9/546 714/18 |
| 2012/0210298 | A1* | 8/2012 | Hodgins | G06F 8/71 717/113 |
| 2013/0204874 | A1 | 8/2013 | Frey | |
| 2013/0297673 | A1 | 11/2013 | McGrath | |
| 2014/0040182 | A1* | 2/2014 | Gilder | G06F 17/30578 707/602 |
| 2014/0214812 | A1 | 7/2014 | St. John | |
| 2015/0052135 | A1 | 2/2015 | Calkowski | |
| 2015/0169614 | A1 | 6/2015 | Murali-Venkataraman | |

(Continued)

OTHER PUBLICATIONS

Warden, Greg "GitHub Code Search", Vertigo Program, dated Mar. 12, 2015, 2 pages.

(Continued)

Primary Examiner — Ashish Thomas
Assistant Examiner — Dustin D Eyers
(74) Attorney, Agent, or Firm — Hickman Palermo Becker Bingham LLP

(57) ABSTRACT

Methods, systems and computer readable storage medium for updating a search engine (SE) version of a repository, the SE version of the repository maintained by a search engine system and corresponding to an SCM version of the repository maintained by an SCM system.

23 Claims, 18 Drawing Sheets

(56) References Cited

U.S. PATENT DOCUMENTS

| | | | |
|---|---|---|---|
| 2015/0310081 A1* | 10/2015 | Baron | G06F 17/30581 |
| | | | 707/623 |
| 2016/0042275 A1 | 2/2016 | Dettman | |
| 2016/0063067 A1* | 3/2016 | Maitra | G06F 17/30011 |
| | | | 707/734 |
| 2016/0147529 A1 | 5/2016 | Coleman | |
| 2016/0292066 A1 | 10/2016 | Stevens | |
| 2017/0060949 A1* | 3/2017 | Li | G06F 17/30463 |
| 2018/0150483 A1 | 5/2018 | Olivier | |

OTHER PUBLICATIONS

"Exploring Elasticsearch", http://exploringelasticsearch.com/github_interview.html, last viewed on Nov. 22, 2016, 16 pages.

Oliver, U.S. Appl. No. 15/362,683, filed Nov. 28, 2016, Office Action, dated Feb. 24, 2017.

Olivier, U.S. Appl. No. 15/362,683, filed Nov. 28, 2016, Final Office Action, dated Jun. 27, 2017.

Olivier, U.S. Appl. No. 15/362,683, filed Nov. 28, 2016, Final Office Action, dated Jan. 10, 2019.

Olivier, U.S. Appl. No. 15/362,683, filed Nov. 28, 2016, Office Action, dated Jun. 17, 2019.

Olivier, U.S. Appl. No. 15/362,683, filed Nov. 28, 2016, Advisory Action, dated Apr. 5, 2019.

* cited by examiner

SYSTEMS AND METHODS FOR INDEXING SOURCE CODE IN A SEARCH ENGINE

TECHNICAL FIELD

Aspects of the present disclosure are directed to source code management systems, and in particular to source code management systems with improved searching functionality.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

In computer software development, source code management systems (also called revision control or version control systems) are used to track and manage computer program source code as the code is written and revised. For readability, the acronym "SCM" will be used in place of "source code management", and although SCM systems are predominantly used to track source code they can be used to track other data.

Examples of SCM systems include systems such as MERCURIAL and GIT. Generally speaking, SCM systems store data—typically source code—in repositories and facilitate access to that data from multiple different client systems. In order to work on a project, a user (using a client system) creates a local copy of the relevant data (e.g. program source code) from a repository and works on that local copy. If the user makes changes that are to be incorporated into the remote version of the data, the user's local copy of the data—or at least those portions that have been changed—is written back to the repository using the SCM system. The SCM system controls access to the repository data and also manages version control for the data.

SCM systems typically manage and track numerous documents/source code files across multiple repositories and for numerous users. Furthermore, the documents/files managed by SCM systems can be changed frequently as users add new documents/files, delete documents/files, and make changes to existing documents/files. To illustrate this, consider Bitbucket (commercially available from Atlassian Pty Ltd) which provides a web-based interface to Git repositories (SCMs). Bitbucket supports up to 20,000 users and thousands of repositories that store approximately 3.5 million repositories.

Given the potentially huge numbers of repositories, documents/files and users, and the frequency with which changes are being made to those documents/files, providing search functionality for SCM systems can be challenging.

SUMMARY

The appended claims may serve as a summary of the invention.

Figure 1:
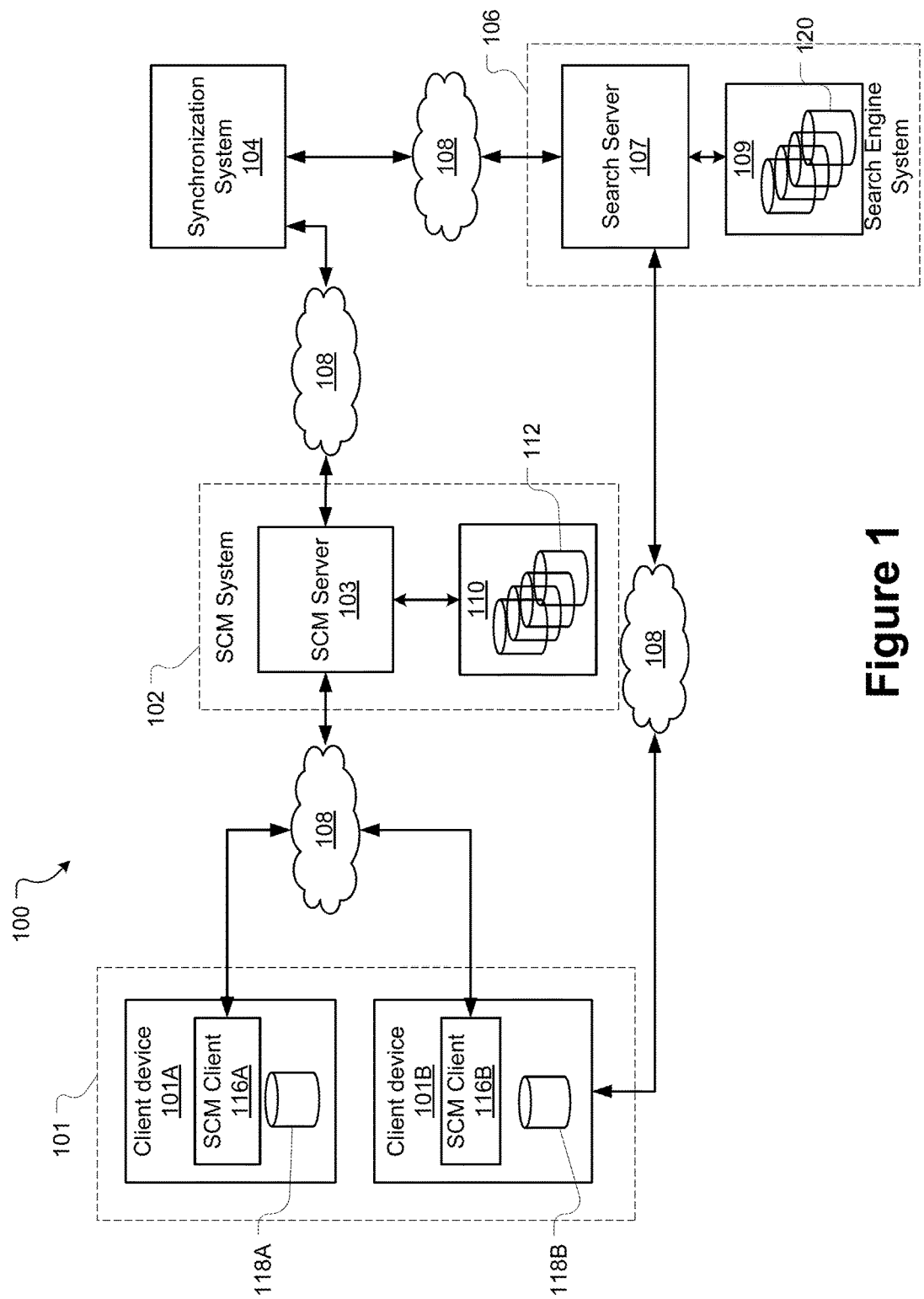
FIG. 1 is a block diagram of a networked environment according to aspects of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Environment Overview

The present disclosure generally relates to systems and methods for synchronizing data, such as source code files, stored in an SCM system with the corresponding data stored by a search engine system. Specifically, the presently disclosed systems and methods update a search engine system version of a repository maintained by the search engine system and corresponding to an SCM version of the repository maintained by the SCM system. In some aspects, the systems and methods are also configured to filter and/or transform content extracted from the SCM system before providing the content to the search engine system to be indexed. In still further aspects, the disclosed systems and methods configure one or more content analyzers of the search engine system so that the content can be searched more efficiently.

One example of a SCM system in which features of the present invention may be implemented is Bitbucket (including Bitbucket Cloud and/or Bitbucket Server), which is commercially available from Atlassian. Bitbucket hosts Git and/or Mercurial repositories for enterprise and/or cloud users.

Git is a version control system used for software development and other version control tasks. A Git working directory is a repository that has complete history and revision tracking metadata and functions. In addition to hosting Git/Mercurial repositories, BitBucket® supports user authentication, repository security, and integration with existing databases and development systems, for use with a large number of users (hundreds of thousands of users) and repositories (millions of repositories).

In the description below, Git (and Bitbucket) are used as an example SCM system for illustrative purposes. It will be appreciated that the various feature and techniques described herein could, with appropriate modifications, be used with alternative SCM systems (e.g., Mercurial and Subversion).

Similarly, Elasticsearch is used as one example of a search engine system, but other search engine systems could be used (e.g. Apache Solr and Sphinx).

In this disclosure, reference to an SCM version of a repository or a SCM repository is reference to the various files/data associated with a particular repository maintained by the SCM server (on file storage). When changes are made to a SCM repository (e.g. a new SCM repository is created, a SCM repository is deleted, or modifications are made to an existing SCM repository) those changes are synchronized with search engine system. This involves creating a corresponding repository on the search engine system which will be referred to as the SE repository or the SE system version of the repository. While a SE repository will be referred to as corresponding to a SCM repository it will be appreciated that the two repositories are not entirely corresponding: some content of the SCM repository and SE repository will be common, but the SCM system and search engine system will store different files/content. For example, and as discussed below, for each SE repository the search engine system maintains (and stores with the SE repository) an index state descriptor which is used in the indexing process. The SCM system does not, however, maintain such a descriptor. Similarly, a given SCM repository may have multiple branches with different files/content associated with each branch. In the embodiments described herein, however, a SE repository only indexes files/content of the default branch of the corresponding SCM repository.

FIG. 1 illustrates an environment 100 in which aspects of the present disclosure are implemented. The environment 100 includes one or more client devices 101, a SCM system 102, a synchronization system 104, and a search engine system 106. The client devices 101, SCM system 102, synchronization system 104, and search engine system 106 communicate with each other over one or more communication networks 108.

The SCM system 102 includes one or more SCM server(s) 103 and file storage server 110. The one or more SCM servers 103 receive/respond to client requests and communicate with the shared file server to retrieve/store data. In certain embodiments, the SCM system 102 is a scalable system including multiple distributed server nodes 103 connected to a shared file server 110. Depending on demand from client devices 101 (and/or other performance requirements), server nodes 103 can be provisioned/de-provisioned on demand to increase/decrease the number of servers offered by the SCM system 102. Each distributed server node may run on a computer and includes one or more application programs, libraries, APIs or other software that implement server functionality. In essence, the server nodes are configured to serve the one or more client devices 101, and communicate with the synchronization system 104.

The SCM system 102 stores SCM repositories 112 on the shared file server 110 and manages the content of those SCM repositories 112. Each SCM repository 112 may include various files (e.g. source code files) and associated file and/or repository metadata. Shared file server 110 may be a distributed system storing content over multiple shared file server nodes which can be provisioned/de-provisioned on demand based on the data storage requirements.

Each client device 101 runs an SCM client 116, which configures the client device 101 to perform client-side SCM operations. Each client device 101 further includes a local memory 118 that stores local copies of one or more SCM repositories 112 on which the user is working (called the working copy).

The SCM client 116 is executed by a processor of the client device 101 to perform various functions. By way of example, some functions performed by the SCM client 116 include creating local repositories; modifying, adding or deleting files in the local repositories; committing/pushing changes made in the local repository to the SCM system 102 (so that the files are written to the relevant SCM repository 112 in the shared file server 110); fetching (e.g. pulling) files from the shared file server 110 (via SCM system 102); providing a user interface for reading/writing source code; etc.

The client device 101 may be any suitable device, for example a desktop computer, a mobile device (e.g. a tablet or mobile phone), or a portable device (such as laptop computer). Only two client devices (101A and 101B) running two SCM clients (116A and 116B) have been illustrated, but normal operation of the SCM system 102 typically involves many more client devices connected to the SCM system 102 to access data from/write data to repositories 112.

Generally speaking, the client devices 101 communicate with the SCM system 102 to 'push' data (e.g. source code files) to a SCM repository 112 (i.e., send any changes made to the locally stored files to the SCM system 102 for storage in the appropriate SCM repository 112) or 'pull' data from the SCM system 102 to be stored locally (i.e., fetch changes/files/repositories from the shared file server 110 to merge in the local database 118). The SCM system 102, in turn, is configured to receive pushed data from the client devices 101 and send requested data to the client devices. In addition, the SCM system 102 is configured to notify the synchronization system 104 whenever content on the shared file server 110 is modified and to respond to requests from the synchronization system 104.

Communications between the client devices 101 and the SCM system 102 are via the communications network 108. For example, the client devices 101 may communicate with the SCM system 102 through a local area network (LAN) of an enterprise in one embodiment. In this case the SCM system 102 will be implemented as an on-premises solution in which the SCM system 102 and client devices 101 are associated with the same business enterprise. In another embodiment, the network 108 may represent a public network and the SCM system 102 may be located off-premises with respect to the client devices 101, such as in a shared data center or cloud computing facility. Further, the communication may be facilitated by any appropriate transport protocol. For example, a Git SCM system supports secure shell (SSH), Hypertext Transfer Protocol (HTTP), Hypertext Transfer Protocol Secure (HTTPS), and Git transport protocols.

The search engine system 106 includes a search server 107 and a file server 109 including database 120. The search server 107 receives/responds to search queries from client devices 101 and commands from the synchronization system 104 and communicates with the file server 109 to retrieve/store data. As described in detail below, the search engine system 106 is operated to index certain content stored by the SCM system 102 in order to allow for searching of that content. To this end, when changes are made to the content managed by the SCM system 102 indexing processes operate to make corresponding changes to the content and search index maintained by the search engine system 106.

To allow users to input search queries and view results, the search engine system 106 provides a search interface (not shown) which a user can access via an appropriate application running on client device 101 (e.g. web browser, SCM client 116, dedicated search client, etc.). When a user submits a search query, the search engine system 106 analyzes the query and identifies search results pertinent to the query from the search index. The search results are then transmitted to the client device 101 for display.

The search server 107 may be scalable and may include multiple server nodes (called a cluster) configured to perform indexing and/or multiple searches simultaneously. The file server 109 may also be distributed and store data over multiple computing devices.

The synchronization system 104 is configured to synchronize content maintained by the search engine system 106 with the corresponding content maintained by the SCM system 102. The synchronization may be performed periodically and/or in response to notification events, for example events raised by the SCM system 102 indicating that a change has been made to a SCM repository (e.g. the addition, deletion or modification of a repository or a file within a repository).

For example, if a new SCM repository is added to the SCM system 102, the synchronization system 104 is configured to retrieve files from that SCM repository and communicate those files to the search engine system 106 to be indexed in a corresponding SE repository. Alternatively, if a SCM repository is deleted from the SCM system 102, the synchronization system 104 is configured to delete the corresponding SE repository (and all its corresponding files) from the search engine system 106. Finally, if a SCM repository has been modified, the synchronization system 104 is configured to identify the individual files of that repository that have been modified, retrieve those files from the SCM system 102, and communicate those files to the search engine system 106 so that they can be indexed/stored in the corresponding SE repository. Each of these scenarios is described in further detail below.

In certain embodiments the synchronization system 104 is also configured to filter the files retrieved from the SCM system 102 and/or transform their content before communicating the files to the search engine system 106.

In FIG. 1 the SCM system 102, synchronization system 104 and search engine system 106 have been depicted as separate systems communicating over one or more networks 108. These systems (or their functionality) may, however, be divided over any number of physical systems communicating in any appropriate manner. By way of example, all three systems could be hosted by a single physical computer system.

Hardware Overview

The operations/techniques described herein are implemented by one or more special-purpose computing systems or devices. For example, in environment 100: each server node 103 of the SCM system is provided by a computer system; each client device 101 is a computer system; shared file repository 112 is provided by/on one or more computer systems; the synchronization system 104 is provided by one or more computer systems; and the search engine system 106 is provided by one or more distributed computing systems.

A special-purpose computing system may be hard-wired to perform the relevant operations. Alternatively, a special-purpose computing system may include digital electronic devices such as one or more application-specific integrated circuits (ASICs) or field programmable gate arrays (FPGAs) that are persistently programmed to perform the relevant operations. Further alternatively, a special-purpose computing system may include one or more general purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 2:
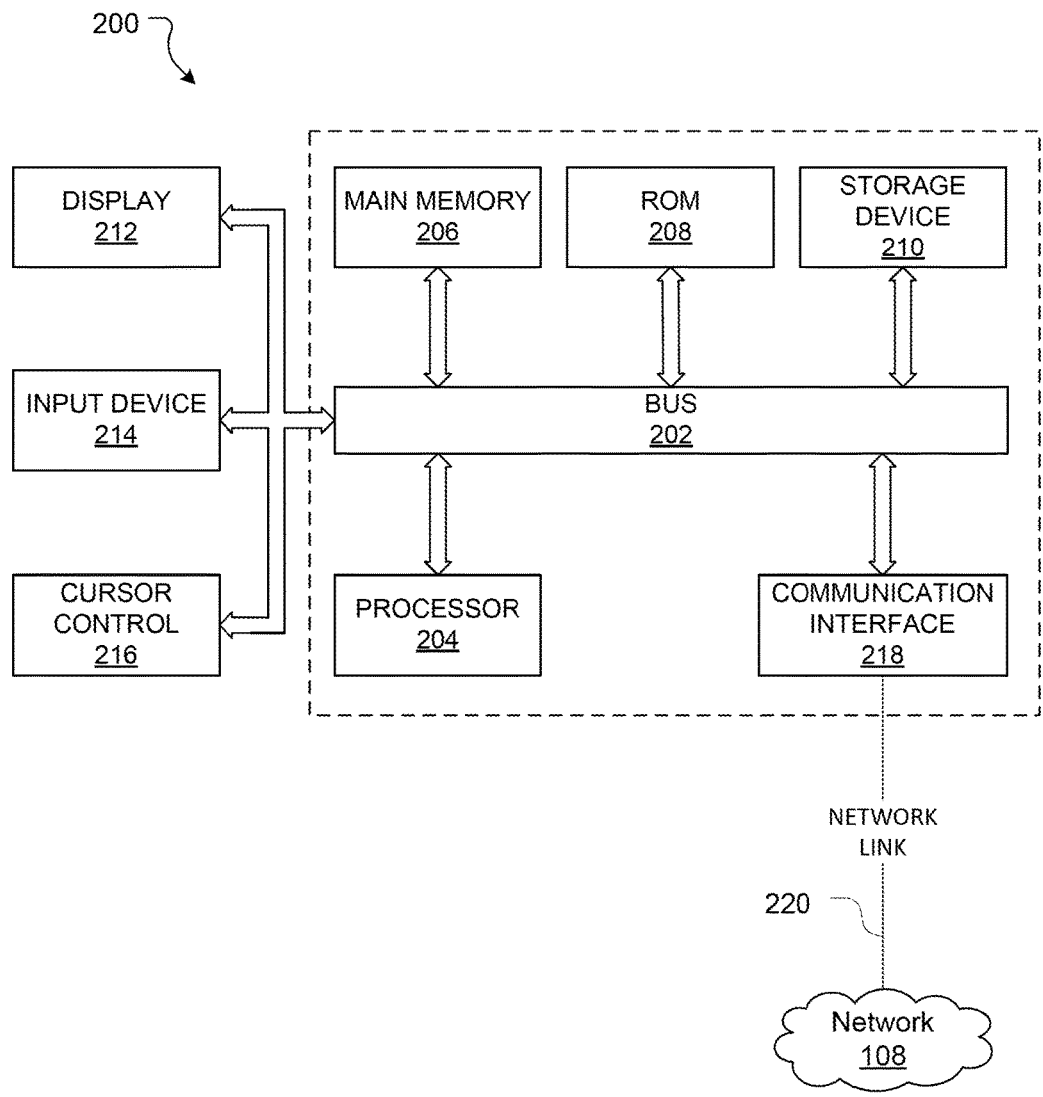
FIG. 2 is a block diagram of a computing system with which various embodiments of the present disclosure may be implemented.

By way of example, FIG. 2 provides a block diagram that illustrates one example of a computer system 200 upon which embodiments of the invention may be implemented. Computer system 200 includes a bus 202 or other communication mechanism for communicating information, and a hardware processor 204 coupled with bus 202 for processing information. Hardware processor 204 may be, for example, a general purpose microprocessor, a graphical processing unit, or other processing unit.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the client device 101, the computer system 200 may be coupled via bus 202 to a display 212 (such as an LCD, LED, touch screen display or other display), for displaying information to a computer user. An input device 214, including alphanumeric and other keys, may be coupled to the bus 202 for communicating information and command selections to processor 204. Another type of user input device is cursor control 216, such as a mouse, a trackball, or cursor direction keys for communicating direction information and command selections to processor 204 and for controlling cursor movement on display 212.

According to one embodiment, the techniques herein are performed by computer system 200 in response to processor 204 executing one or more sequences of one or more instructions contained in main memory 206. Such instructions may be read into main memory 206 from another storage medium, such as a remote database. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Computer system 200 also includes a communication interface 218 coupled to bus 202. Communication interface 218 provides a two-way data communication coupling to a network link 220 that is connected to the communication network 108. For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Computer system 200 can send messages and receive data, including program code, through the network(s) 108, network link 220 and communication interface 218. In case the computer system hosts the synchronization system, the computer system 200 may receive an event notification from the SCM system 102 via the network 108, network link, and communication interface 218. The received event notification may be executed by processor 204 as it is received, and/or stored in storage device 210, or other non-volatile storage for later execution.

As described previously, the computer system 200 as described above may be configured in a plurality of useful arrangements. In one arrangement, the computer system 200 is a server computer (such as a computer system hosting the synchronization system 104) comprising one or more non-transitory computer-readable data storage media stored with one or more sequences of instructions/software modules which when executed cause the computer to perform the operations/techniques that are described herein.

Synchronization System

As discussed above, the synchronization system 104 is configured to synchronize the content maintained by the search engine system 106 with the content stored by the SCM system 102.

Figure 3:
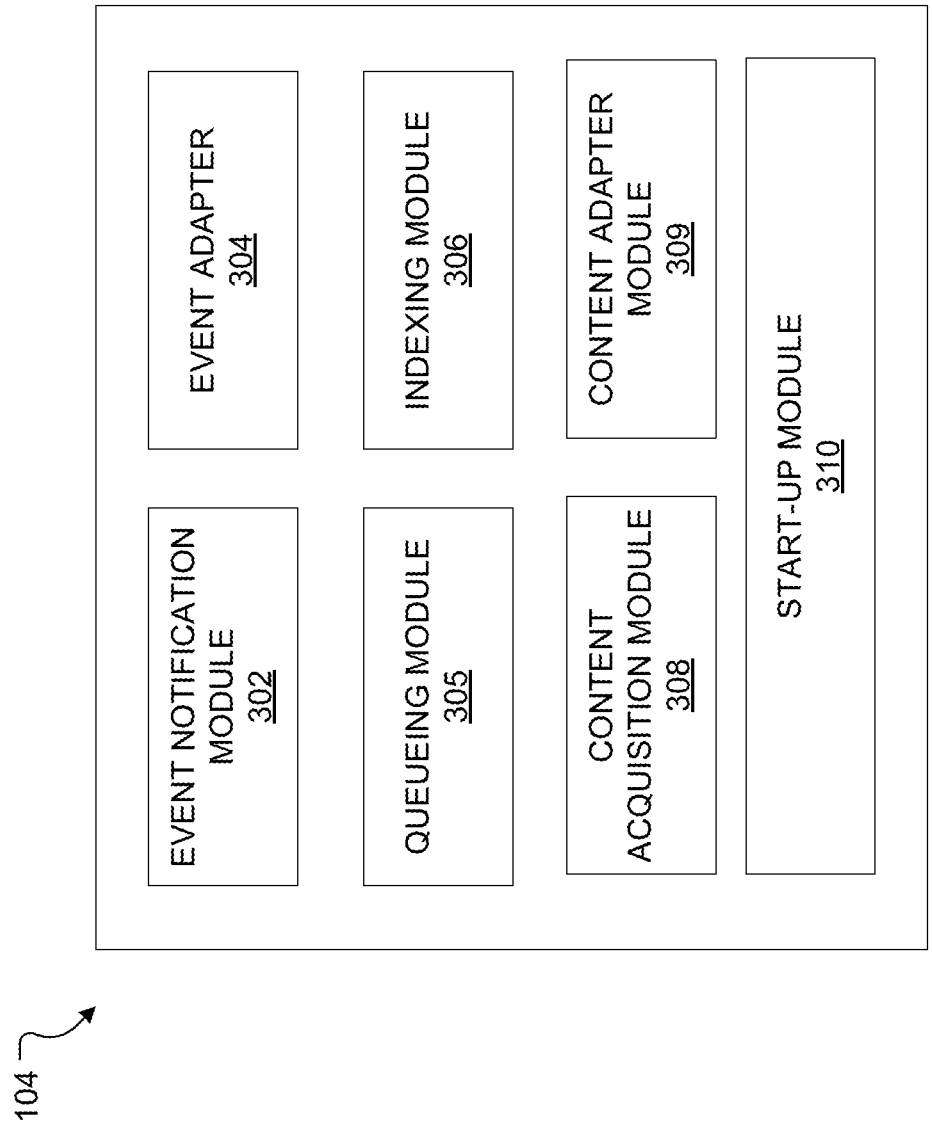
FIG. 3 is a block diagram illustrating functional modules of a synchronization system.

FIG. 3 is a block diagram illustrating functional modules of the synchronization system 104. In the illustrated embodiment, the modules include: an event notification module 302, an event adapter module 304, a queueing module 305, an indexing module 306, a content acquisition module 308, a content adapter module 309, and a start-up module 310.

A brief description of the functions performed by these modules is provided, followed by a more detailed discussion of their operation.

The event notification module 302 is configured to listen for/receive trigger events generated by the SCM system 102. These trigger events are generated when a SCM repository maintained by the SCM system 102 is changed. This may occur, for example, when a new SCM repository is created and added to the SCM system 102, an existing SCM repository is deleted from the SCM system 102, or an existing SCM repository is modified in the SCM system 102 (e.g. a file of that repository is added, deleted, or changed).

The event notification module 302 passes events to the event adaptor module 304, which processes the events to extract relevant details and generate event descriptors (described further below) for, ultimately, use by the indexing module 306. The event adaptor module 304 is configured to generate event descriptors of a standard format. This allows the synchronization system 104 to work with different SCM systems which may provide event information in different formats. As one example, the synchronization system 104 may be configured to work with a cloud based SCM system (e.g. Bitbucket cloud) which provides trigger events in one format and to work with an enterprise SCM system (e.g. Bitbucket server) which provides trigger events in a different format.

Event descriptors generated by the event adaptor module 304 are passed to the queueing module 305. The queueing module 305 is configured to receive the event descriptors and manage one or more queues from which event descriptors are fed in a controlled manner to the indexing module 306 for further processing.

The queueing module 305 may also, or alternatively, be configured to determine whether duplicate event descriptors have been queued and, if so, remove the duplicates. Duplicate event descriptors may be queued, for example, when an event descriptor is generated at start-up by the synchronization system 104 and the synchronization system subsequently receives another event descriptor for the same repository from the event notification module 302.

The indexing module 306 processes event descriptors received from the queueing module 305. The processing performed by the indexing module 306 depends on the type of event. For example, if a given event descriptor indicates that a SCM repository has changed, the indexing module 306 operates (in conjunction with other modules) to retrieve the files that have changed from the SCM system 102 and pass those files to the search engine system 106 for indexing. Operations of the indexing module 306 are described in detail below.

The content acquisition module 308 is configured to receive content requests from the indexing module 306 and interface with the SCM system 102 to retrieve the relevant content. In certain embodiments, the content acquisition module 308 also operates to filter the content retrieved from the shared file server 110.

In some embodiments the content acquisition module 308 is configured to return retrieved content (filtered or otherwise) directly to the indexing module 306. In other embodiments the content acquisition module 308 is configured to determine whether adaptation of the retrieved content is required and, if so, pass that content to the content adapter module 309.

The content adapter module 309 is configured to receive content from the content acquisition module 308, transform the received content, and provide the transformed content to the indexing module 306.

The start-up module 310 is configured to initiate synchronization of the content stored by the search engine system 106 with the corresponding content stored by the SCM system 102 at various different times. For example, the startup module may initiate synchronization at fixed times such as at system startup. Alternatively or in addition, the start-up module may also initiate synchronization in response to ad hoc/unpredictable triggers (such as a configuration change or a manual trigger by an administrator).

The functional modules of the synchronization system 104 can be implemented as hardware, software or a combination of hardware and software. As described previously, if the modules are implemented as software, the software may be stored in non-transitory computer-readable data storage media 210 and may be executed by the processor to cause the synchronization system 104 to perform operations of the software modules.

While each module of the synchronization system 104 is described as performing particular operations, operations/processing described as being performed by one particular module could be performed by one or more different modules.

The operations of the synchronization system 104 will be described in detail with reference to FIGS. 4-11.

Indexing Process Overview

Figure 4:
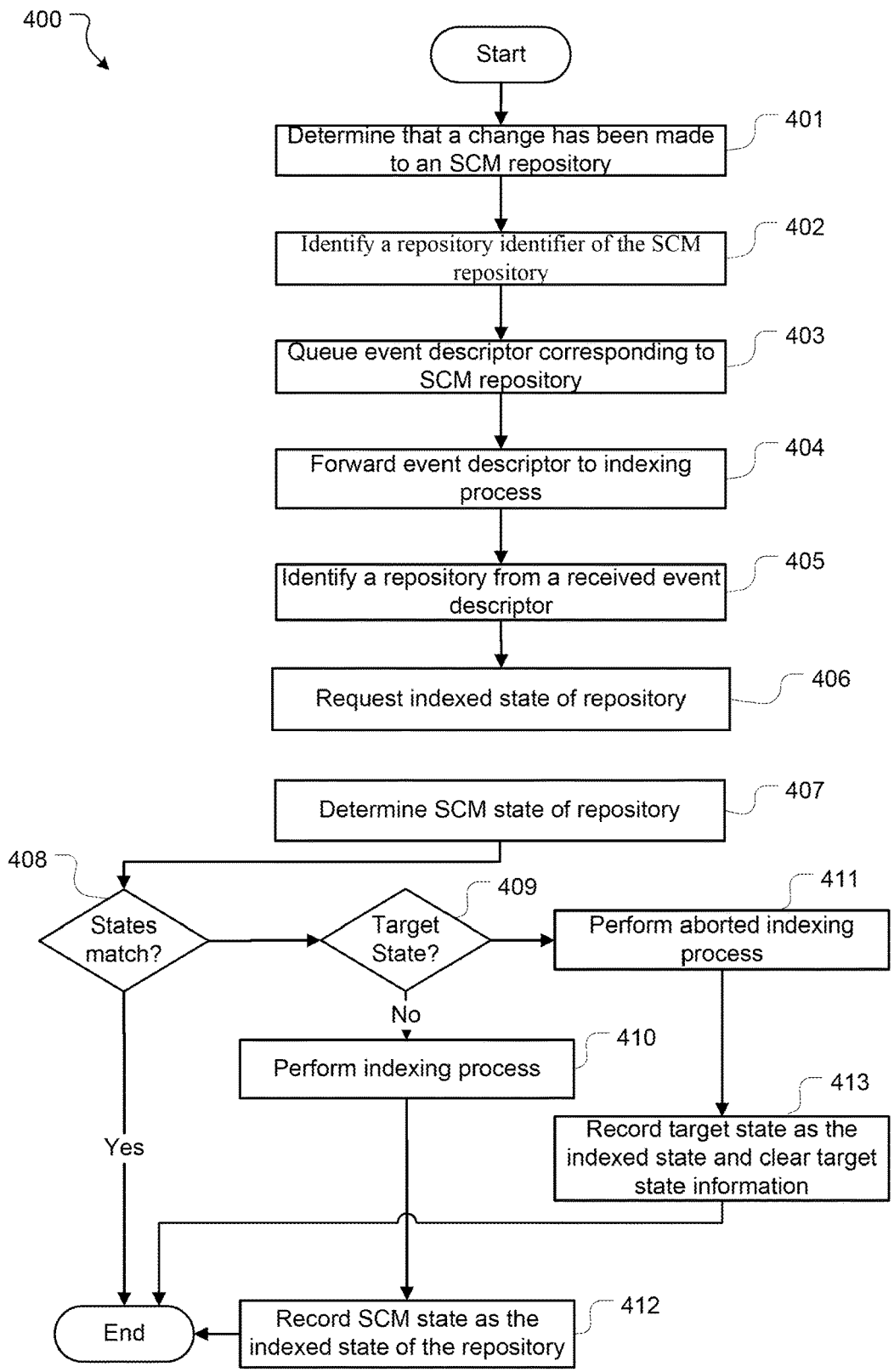
FIG. 4 is a flowchart illustrating a high-level method for synchronizing data between a SCM system and a search engine system.

FIG. 4 provides a high level illustration of a method for processing an event and synchronizing the content stored by the search engine system 106 with the content stored by the SCM system 102 for that event. This process is repeated for each event.

The method begins at step 401, where a determination is made that a change has been made to an SCM repository. In certain embodiments, this determination is made when event information in respect of a given event is received at the event adaptor module 304. Event information may be received from the event notification module 302 (where the event is triggered by a repository change on the SCM system 102) or from the startup module 310 (which creates events during startup).

At step 402, a repository identifier of the SCM repository that the change has been made to is identified. In some embodiments, the event adaptor module 304 makes this determination by processing the event information to extract relevant details and generate an event descriptor. Event descriptors are described below. Among other things, the event descriptor includes an identifier that identifies the SCM repository to which the event relates (i.e. the repository on the SCM system 102 which has been added/deleted/modified), and a field indicating the type of event (e.g., whether it is a repository addition, deletion or modification event.

At step 403, the event descriptor is placed in a queue by the queuing module 305. Queuing can be managed in various ways. For example, in certain embodiments the queueing module 305 maintains a new event queue (in which new event descriptors that are being queued for the first time are placed) and an existing event queue (in which event descriptors that were not successfully indexed in a previous attempt are placed). By way of further example, the queuing module 305 may also, or alternatively, maintain different queues for different types of events (e.g. repository deletion events may be placed in a deletion queue, repository addition events in a new repository queue, and repository modification events in a repository modification queue). As and when indexing processes are available, the event at the head of a given queue is assigned to an indexing process. The queuing module 305 may also de-duplicate event descriptors at this step by inspecting the repository identifiers and event types in event descriptors. If two or more similar event types (e.g. two or more delete events) exist for the same repository id in the queue, the queuing module determines that an event is duplicated, and discards the duplicated copies of the event descriptor. In certain embodiments, the older event is kept while the newer event is discarded.

At step 404, an event descriptor is forwarded to an indexing process controlled by the indexing module.

At step 405, the repository to which the event relates is identified from the repository identifier in the received event descriptor.

At step 406, an indexed state of the SE version of the repository is determined. In certain embodiments, this is done by generating an indexed state query using the repository identifier and communicating the indexed state query to the search engine system 106. In response, in certain embodiments, if indexed state information of the corresponding SE repository is present in the search engine system 106, this information is provided to the indexing module at step 407. The indexed state information provides the indexed state (if any) of the repository in question—i.e. the current state of the repository on the search engine system 106. In the described embodiments, the indexed state of a repository is recorded in an index state descriptor which is stored on the search engine system 106 with other files/data relevant to the repository. If an index state descriptor for the repository exists on the search engine system 106 it will include information defining the indexed state of the repository. If the repository in question is a new repository, the search engine system 106 will not have a corresponding index state descriptor, in which case the indexed state of the repository is considered to be zero or null (indicating that the repository in question is a repository that has not previously been indexed).

At step 407, the repository identifier is used to identify the state of the repository on the SCM system 102. This is determined by generating an SCM state query using the repository identifier and communicating the query to the SCM system 102. In response, SCM state information is received from the SCM system 102. The SCM state information defines a state of the SCM version of the repository at the time the query is handled by the SCM system and will be referred to as the SCM state of the repository. This is the case even though the so-called SCM state may not actually reflect the current state of the repository as maintained by the SCM system 102 (e.g. in cases where a change is made to the repository after the SCM state of the repository is determined).

At step 408, the indexed state of the repository (determined at 406) is compared with the SCM state of the repository (determined at 407). If the indexed state is the same as the SCM state, no further processing of the event descriptor is required and the process ends.

If, at 408, the indexed state is not the same as the SCM state, the method proceeds to step 409, where the index state descriptor is inspected to determine if target state information is present. The target state information indicates that a previous attempt at updating the SE version of the repository had failed.

Throughout this disclosure, the operations required to synchronize the indexed state of a SE repository with the SCM state of that repository are referred to as a unit of work. Importantly, the synchronization processes described herein operate to ensure that once a unit of work for a given repository has been commenced it is successfully completed before another unit of work for that same repository can be attempted. Further, the manner in which units of work are defined and processed in the described embodiments is such that units of work are idempotent—if the same unit of work is rerun multiple times, consecutively, the end result will be the same as if the unit of work was run once only (i.e. there are no other changes made). This allows indexing of the SCM repositories to take place in an incremental manner without any data loss or corruption.

In the embodiments described below, commit identifiers are used to identify repository states. In Git, for example, when a user makes changes to a source code file and wishes to upload those changes to the SCM system 102, the user "commits" the changes. Each commit is associated with a commit ID, which is a check-sum of the contents of a file or directory structure when the user commits the changes. The mechanism used for calculating this checksum is SHA-1 hash, which is a 40-character string composed of hexadecimal characters and calculated based on the contents of the file or directory structure. A commit ID, therefore, uniquely represents a state of the SCM repository at a particular point in time.

Accordingly, and embodiments described herein, the indexed state of a repository is the commit identifier that was used in the last successful indexing process. The SCM state of a repository the commit identifier of the most recent commit performed on the default branch of the repository (at the time the SCM system 102 was queried to identify the SCM state). This SCM state, therefore, can be obtained from the SCM system 102 by use of a git command such as git rev-parse HEAD At step 409, if the target state information is not present, the method proceeds to step 410, where the method performs an indexing process. The indexing process may include identifying content (e.g. files) in the repository that have changed and therefore need to be updated in the search engine system 106. This identification is based on the SCM state of the repository (obtained from the SCM system 102 at step 407) and the indexed state of the repository (obtained from the search engine system at step 406).

In one embodiment, the indexed and SCM states of the repository are sent to the SCM system 102. The SCM system 102 compares the two states and notifies the synchronization system 104 of all files in that particular repository that have changed since it was last indexed. If the indexed state is zero/null, the SCM system 102 provides a list of all the files in that particular repository. In the git context, and where commit IDs are used as the indexed and SCM states, the changes that need to be made (i.e. the unit of work) can be determined by use of a git diff command, for example: git diff-tree 8fbb3f642a3557e825e1c0361f8187c0d53aa568 . . . HEAD.

The indexing process further includes extracting content from one or more of the identified files from the SCM system 102 and providing the extracted files to the indexing module 306.

Finally, the indexing module 306 transmits relevant content from the extracted files to the search engine system 106 for indexing.

Upon completion of the indexing process, the method proceeds to step 412, where the indexing module 306 updates the indexed state information in the index state descriptor with the SCM state.

If at step 409, target state information is present, the method proceeds to step 411, where an aborted indexing process is performed. The aborted indexing process reattempts to update the SE version of the repository to the target state indicated by the target state information. The aborted indexing process may include identifying files in the SCM version of the repository that have been modified between the indexed state and target state, extracting content from at least one of the modified files, and transmitting the extracted content to the search engine system 106 for storage thereon.

Upon completion of the aborted indexing process, the method proceeds to step 413, where the index state descriptor in the search engine system 106 is updated to record the target state as the indexed state and delete the target state information.

In the embodiments described, the synchronization system 104 creates and uses a number of descriptors. Some of these descriptors are utilized for indexing, whereas other descriptors are used to aid with searching. The descriptors used in the present embodiments include an event descriptor, an index state descriptor, a file descriptor, a project descriptor, and a repository descriptor. Examples of each of these descriptors, and the information they store, are provided below. It will be appreciated, however, that alternative descriptors may be used and the particular information maintained by a given descriptor may be different to the information described in the examples.

Event Descriptor

As described previously, an event descriptor is created by the event adapter module 304 upon receiving a trigger event from the event notification module 302. Event descriptors can also be created by the event adapter module 304 during startup. To create event descriptors, the event adapter 304 operates to standardize the event information received from the SCM system 102 into a format that can be used by the indexing module 306.

The event descriptor for a given event includes an event type and a repository identifier which identifies the repository that is affected by the event. The event type can, for example, be a repository deletion event, a repository addition event, or a repository modification event. The event type information can be used for queuing events and allocating events to indexing processes for processing. The repository identifier is used to retrieve the indexed state of a repository from the search engine system 106 and the SCM state of the repository from the SCM system 102.

The event descriptor may further include a counter (referred to as an EventRetries counter in this disclosure) that indicates the number of times the indexing module has attempted to index that particular event and a timestamp indicating the date and time the event descriptor was first created. If the EventRetries counter is zero, the queuing module 305 may be configured to add the event to a 'new events' queue and if the EventRetries counter has a non-zero value, the event descriptor may be added to a re-queued events queue.

An example of an event descriptor is provided in Table A below. Although a table has been used to illustrate information stored in the event descriptor, the relevant information need not be stored in a table and could be stored in any appropriate format (e.g. a simple text file).

TABLE A

| Example event descriptor | |
| --- | --- |
| Event type | Repository Modification |
| Repository ID | 347kdsfjh38764 |
| EventRetries | 0 |
| Timestamp | 10:00:03 13/03/2015 |

Index State Descriptor

An index state descriptor is created for each SCM repository that is indexed by the search engine system 106 and captures information relevant to the indexing process of a repository. The index state descriptor for a given SE repository stores various information used to keep the SE repository synchronized with its corresponding SCM repository and to assist with searching.

One example of an index state descriptor is provided in Table B below. Although a table has been used to illustrate information stored in the index state descriptor, the relevant information need not be stored in a table and could be stored in any appropriate format (e.g. a .txt file).

TABLE B

| Example index state descriptor | |
| --- | --- |
| RepositoryID | 42 |
| IndexedCommitID (Indexed state identifier) | 346kjhfdjshw8479483 |
| ToCommitID (Target state identifier) | 80374ldfjsaldj9827432 |
| IndexRetries | 2 |
| Locked | 10:00:03 13/03/2015 |
| Fork | 0 |
| Public | 1 |
| Version | 2 |

The example index state descriptor of Table B is for use with a git-based SCM system. As such, the syntax of some of the fields in the illustrated index state descriptor are specific to Git and may vary if other version control systems were used. For example, in the example repository states are represented by commit identifiers. If the repository is related to some other version control system states may instead be represented (for example) by a repository and version number.

The repository id field stores an identifier of the repository to which the index state descriptor relates (e.g. a Git repository ID). As there is at most one index state descriptor per repository, the repository identifier serves as a unique identifier for the index state descriptor.

The 'IndexedCommitID' operates as an indexed state identifier to identify the state of the repository as currently indexed. In the Table B example, the current indexed state is the last commitID that was successfully indexed.

The 'ToCommitId" operates as a target state identifier which is used once a unit of work has been commenced in order to identify the target state that the SE repository will be in on successful completion of the indexing. If the last indexing process was successfully completed, the target state identifier will be empty/indicate there is no current target state. Accordingly, as well as recording the actual target state of a given indexing process, the target state identifier operates as a flag to indicate that an indexing process has not been successfully completed (i.e. if an indexing process encounters a populated target identifier field that it did not populate itself, the process knows that a previous attempt to update the SE system failed). In the Table B example, the target indexed state is the commit ID which the SE repository is currently being synchronized to.

The IndexRetries field stores a counter which counts the number of attempts that have been made to complete the current unit of work (i.e. the number of attempts that have been made to update the search engine system 106 to reach the target state).

The lock identifier indicates that an indexing process is currently being performed on the repository. When used, the lock identifier records a timestamp at which the lock was created.

In some embodiments, the index state document may also include a public identifier and a fork identifier. The public identifier indicates whether the repository is a private repository (accessible by authorized users) or a public repository (accessible by anyone). The Fork identifier indicates whether the repository is a fork of another repository or not. Generally speaking, a fork is a copy of a repository. Commonly, forks are used to either propose changes to a user's repository or to use another user's repository as a starting point. The public identifier and the fork identifier are typically used by the synchronization system 106 to speed up internal operations.

The version field records a number (or other data) which indicates the current version of the index state identifier. The version is updated each time the index state descriptor is updated.

File Descriptor

A file descriptor represents a single repository file. A file descriptor is created and uploaded to the search engine system for each SCM repository file that is indexed. For example, whenever a new file is added to a repository in the SCM system 102 and the indexing module 306 wishes to index that file in the search engine system 106, the indexing module 306 creates a file descriptor and indexes it in the search engine system 106.

When a file maintained by the SCM system 102 is changed, the indexing module 306 updates the file descriptor for that file and transmits the updated file descriptor to the search engine system 106. The search engine may subsequently delete a previous file descriptor and write over with the updated file descriptor. For example, when the status of a repository is changed from public to private or vice versa in SCM system 102, the status is correspondingly changed in the file descriptor in the search engine system 106.

An example file descriptor is provided in Table C below. Although a table has been used to illustrate the information stored in the file descriptor, the relevant information need not be stored in a table could be stored in any appropriate format (e.g. a .txt file).

TABLE C

| Example file descriptor | |
| --- | --- |
| FileID: | 42_src/foo/bar/test.hs |
| RepositoryID: | 42 |
| ProjectID: | 3742 |
| Public: | 0 |
| Fork: | 0 |
| Content: | [asdghwe4uiydksk . . . flwhefuiysalcnjk]] |
| Extension: | .txt |
| Path: | src/foo/bar/test.hs |
| Size: | 21 bytes |

The example descriptor includes multiple metadata fields, such as the FileID field, repositoryID field, projectID field, Public field, and fork field.

The FileID field stores a unique identifier for the file descriptor. In the present example, the FileID is generated as a compound key using the repository ID and a canonical version of the file path in SCM system 102.

The RepositoryID field stores an identifier of the repository the file belongs to.

The 'ProjectId' field stores a project id of a project to which the file belongs. This can be used for search purposes (e.g. if a user wishes to perform a search limited to files in a particular project).

The public field indicates whether the repository to which the index state descriptor relates is a public repository or a private repository. This can be used for search purposes (e.g., to restrict access to authorized users if it is a private file or allow access to all users if it is a public file).

A fork field indicates whether this repository has been forked from an existing repository.

A content field, which generally includes the actual content of the file (which, as described below, may be modified from the version stored by the SCM system 102 to include prepended line numbers). In some cases, if a file is too large or contains binary text, this field can be left empty.

An extension field, which includes the file extension (e.g. txt if the file is called README.txt). The file extension is stored in order to allow users to limit searches to files of particular types.

A path field, which indicates the relative path of the file within the SCM repository (e.g. README.txt or src/foo/bar/test.hs).

A size, which indicates the size of the file (e.g. in bytes).

Repository Descriptor

The repository descriptor is used to store information about a repository. It is typically used to improve the efficiency of searches by allowing the search engine system 106 to quickly search for or limit searches to particular repositories and for retrieving repository information for rendering this information as part of the search results. The repository descriptor may include fields that can be used as filters or modifiers during a search.

Repository descriptors are stored on the search engine system 106, together with other information relevant to the repository in question.

An example repository descriptor is provided in Table D below. Although a table has been used to illustrate the information stored in the repository descriptor, the relevant information need not be stored in a table could be stored in any appropriate format (e.g. a .txt file).

The repository descriptor may be identified by the identifier of the corresponding repository. The fields of this descriptor include:

A Repository ID, which includes the ID of the repository.

A Name, which includes the name of the repository.

A Slug, which includes a URL friendly version of the repository name.

A QuickSearchProjectName, which includes the name of the project used in quick search. This can be used for search purposes (i.e., to perform a quick search based on repository/project name. It can support partial matches).

A QuickSearchProjectName.length, which includes the length of the name in the field QuickSearchProjectName.

A ProjectId, which includes the project ID of the repository.

An AvatarType, which includes the type of the avatar (e.g. repository vs. repo or Gravatar avatar).

AvatarData, which includes data in respect of the avatar. This depends on the avatar type. For example in the case of a gravatar the data would contain the full URL of the avatar image.

A public Boolean flag indicating whether the repository is public or private.

A fork Boolean flag indicating whether the repository is a fork of another repository or not.

Startup Process

Occasionally, distributed systems are subject to failure, due to network or application errors, resulting in lost trigger events or system unavailability. When this happens, the SCM system 102 may send a 'start' command to the synchronization system 104 which commences a startup process (handled by the startup module 310).

The startup process involves various system checks to determine whether the SCM system 102 and the search engine system 106 are synchronized and, if not, to synchronize the two. Normal indexing (as described with reference to FIG. 4) can resume thereafter.

One startup check is a mapping schema check, which involves inspecting the mapping schema used by the search engine system 106 to determine if it is compatible with the mapping schema utilized by the SCM system 102.

A mapping schema describes the fields or properties that indexed files may have, the data type of each field—such as string, integer, or date—and how those fields should be indexed and stored. If this schema is not provided by the SCM system 102 at the start of the synchronization process, the search engine system 106 may dynamically define the schema for files when it receives the files from the synchronization system 104. However, such dynamic mapping may occasionally be incorrect. For example, the search engine

TABLE D

Example repository descriptor

| | |
|---|---|
| RepositoryID: | 479483 |
| Name: | Foo Bar Magic |
| Slug: | Foo_Bar_Magic |
| QuickSearchProjectName | foo bar |
| QuickSearchProjectName.length | 7 |
| Project ID | 3743 |
| AvatarType | Gravatar |
| AvatarData: | http://stackoverflow.com/users/4504876/foo-bar |
| Public: | 1 |
| Fork: | 0 | system 106 may incorrectly define the projectID field in table D as a 'long' datatype instead of an 'integer' datatype. To prevent these errors, the SCM system 102 may define its own mapping schema and forward it to the search engine system 106 for storage and use.

Another startup check is a current synchronization check, which involves inspecting the search engine database 120 to determine whether the repositories stored in the database 120 are synchronized with the latest states of the corresponding repositories in the SCM system 102.

Figure 5:
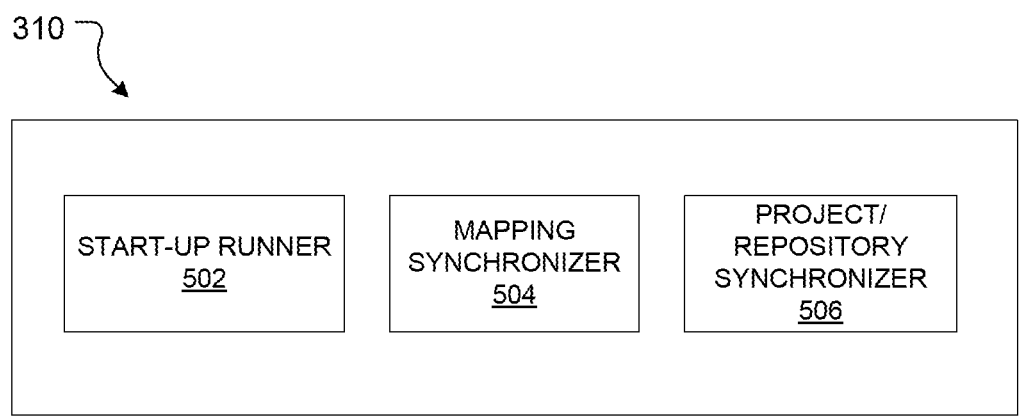
FIG. 5 is a block diagram illustrating sub-modules of the startup module shown in FIG. 4.

FIG. 5 illustrates a block diagram of the various start-up sub-modules that are used for the start-up check process. These modules include: a mapping synchronizer 504 configured to map document field data types, ensuring that they are correctly tokenized, analyzed, indexed and stored in the search engine system 106 with a corresponding mapping schema utilized by the SCM system 102; a repository synchronizer 506 configured to synchronize the repositories between the search engine system 106 and the SCM system 102; and a start-up runner 502 configured to invoke the mapping synchronizer 504 and the repository synchronizer 506.

Figure 6:
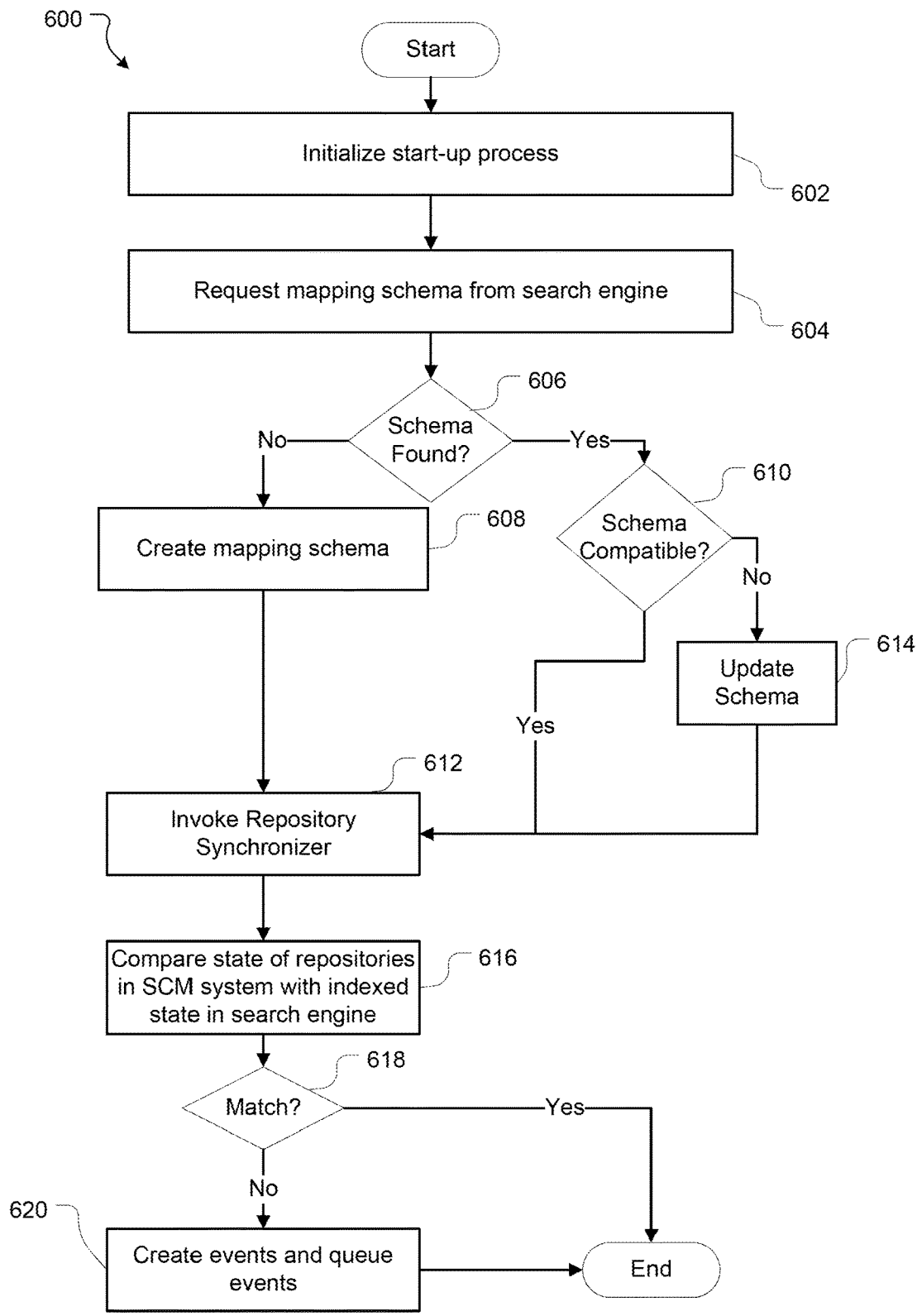
FIG. 6 is a flowchart illustrating a method for synchronizing content of a SCM system with a search engine system at start-up.

FIG. 6 illustrates a method 600 for synchronizing the search engine system 106 with the SCM system 102 during start-up. Method 600 is described with reference to the modules of FIG. 5, however the operations described could be performed by alternative modules.

The method begins at step 602, where a start-up process is initialized. The startup runner 502 invokes the mapping synchronizer 504 at this step.

At step 604, the mapping synchronizer 504 requests the mapping schema from the search engine system 106.

At step 606, the mapping synchronizer 504 determines whether a mapping schema has been received from the search engine system 106. If the search engine system 106 does not have the requested mapping schema, the method proceeds to step 608 where the mapping synchronizer 504 creates a mapping schema based on the mapping schema of the SCM system 102 and forwards it to the search engine system 106 for storage and use.

If, at 606, a mapping schema is returned from the search engine system 106, the mapping synchronizer 504 determines at 610 whether the returned mapping schema matches the mapping scheme (i.e., the field types) defined by the SCM system 102. If the schemas match, the method proceeds to step 612. However, if the schemas are different, the method proceeds to step 614 where the mapping synchronizer 504 is configured to update (i.e., modify/amend) the mapping schema used by the search engine system 106 based on the SCM system schema. The updated schema is then uploaded to the search engine system 106 for use.

At step 612, the mapping has been synchronized. The startup runner 502 is then configured to invoke the repository synchronizer 506, which is configured to determine whether the repositories in the search engine system 106 are synchronized with the repositories on the SCM system 102.

To that end, at step 616 the repository synchronizer 506 retrieves the SCM states of all the repositories maintained by the SCM system 102 and the indexed states of all the repositories in the search engine system 106.

At 618 the SCM states are compared to the indexed states to determine whether they match or not. If the states do match, the search engine system 106 is already synchronized and the method ends.

If at 618 there is a mismatch between the SCM states and indexed states, the repository synchronizer 506 is configured to provide information about mismatched repositories to the event adapter 304. The event adaptor 304, in turn, creates event descriptors for all mismatched repositories and at step 620 provides these to the queuing module 305.

If the search engine system 106 does not include an index state descriptor for a repository that is maintained by the SCM system 102, the event adapter 304 generates a 'repository addition' event descriptor indicating that an entirely new SCM repository has been created and needs to be indexed. If a repository exists in the search engine system 106 but not in the SCM system 102, the event adapter 304 generates a 'repository deletion' event descriptor, indicating that a SCM repository has been deleted. If a repository is maintained by both the SCM system 102 and the search engine system 106, but the SCM state and indexed state of that repository differs, the event adapter 304 generates a 'repository modification' event descriptor, indicating that the SCM repository has been modified. All event descriptors passed to the queueing module 305 to be queued and (eventually) processed by the indexing module 306).

Once the startup checks are performed and any startup event descriptors have been generated and queued, the synchronization system 104 begins receiving event notifications and processing event descriptors. Although process 600 is referred to as a 'startup process', this can be performed at various stages—e.g., when a configuration is changed or on an ad hoc basis when synchronization is triggered by an administrator. Indexing is stopped when the indexing module 306 receives a 'stop' command. This is invoked to ensure the system shuts down correctly.

Indexing Process

FIGS. 7A-7I are flowcharts illustrating in detail a method for updating a search engine (SE) version of a repository and specifically for processing an event descriptor to synchronize the SE repository (maintained by the SE system 106) with a corresponding SCM repository (maintained by the SCM system 102). Specifically, FIGS. 7A-7I show the processing of an event descriptor that defines a repository addition or modification event. The processing of a repository deletion event is described below with reference to FIG. 9.

The method of FIGS. 7A to 7I takes into consideration a number of potential errors that may be encountered during synchronization/indexing. Such errors may occur, for example, because the search engine system 106 is unresponsive, because an operation has timed out, because the network bandwidth is insufficient for transmitting files, or because the SCM system 102 is unresponsive.

Following the description of the method with respect to FIGS. 7A to 7I, FIGS. 8 and 9 describe two examples of this method being performed in cases where no errors are encountered (i.e. in which the error handling steps are omitted).

As noted above, the indexing module 306 retrieves events (event descriptors) from the queuing module 305. In certain embodiments, the indexing module 306 can be configured to launch/control multiple individual indexing processes (e.g. by threading) which can be run concurrently. In this case, the rate of event retrieval is proportional to the number of indexing processes running concurrently. Each indexing process may retrieve an event descriptor from the queue and attempt to index data corresponding to that event in the SE system 106. In the case of a repository addition or a repository modification event, an indexing process operates in accordance with the method of FIGS. 7A-7I, which depict the operational steps of a single indexing process.

At step 7002, an indexing process retrieves an event descriptor from the queueing module 305.

Before initiating indexing for the retrieved event descriptor, the indexing process, in some embodiments, is configured to check whether it is possible to index data corresponding to the received event descriptor. For example it may identify the repository corresponding to the event descriptor from the repository field in the event descriptor and determine whether the identified repository supports data streaming. Some version control systems, such as Git, support data streaming, i.e., it is possible to retrieve multiple files from these repositories using a single retrieve command. However, other version control systems may not support data streaming, i.e., multiple cycles of retrieve commands may be needed to retrieve multiple files. It will be appreciated that this iterative process of retrieving files can negatively affect efficiency if the synchronization system 104 has to retrieve a large number of files from an SCM repository. Accordingly, in some embodiments, if the indexing process determines that the identified repository does not support data streaming, the indexing process may discard the event descriptor and end the process.

At step 7004, the indexing process determines whether too many attempts to process the event descriptor currently being handled have been made. In the present example, this determination is made with respect to the EventRetries counter of the event descriptor and a stored event retries threshold (which is set to the maximum number of attempts that can be made to process an event). A suitable event retries threshold may, for example, be 5 retries, though any appropriate number may be used. As described above, when an event descriptor for a new event is created the EventRetries counter is initialized to zero (or null). If processing the event descriptor fails, the EventRetries counter is incremented (see, for example, step 7608 described below).

If, at 7004, the number of times indexing has been attempted for the event descriptor exceeds the threshold value (i.e. the value of the EventRetries counter exceeds the event retries threshold), the method proceeds to step 7006. At 7006 the event descriptor is discarded (or placed in a dead letter queue) so no further attempts to process it are made.

Alternatively, if at 7004 the number of times indexing has been attempted for the event descriptor does not exceed the threshold value (i.e. the value of the EventRetries counter is less than or equal to the event retries threshold), the process continues to step 7008. At 7008 the indexing process retrieves the repository identifier from the event descriptor and generates/sends a request to the search engine system 106 for an index state descriptor in respect of that particular repository identifier.

As indicated at 7010, a timeout is applied to the request made to the search engine system at 7008.

Various timeouts are employed throughout method 7000. See, for example: step 7010 of FIG. 7A; steps 7112, 7118, 7122 of FIG. 7B; steps 7206, 7216 of FIG. 7C; step 7404 of FIG. 7E; step 7510 of FIG. 7F; steps 7704, 7712 of FIG. 7H; step 7806 of FIG. 7I. These timeouts are provided to account for the possibility that an operation involving a networked system (e.g. requests to retrieve or upload data from/to the SCM system 102 or search engine system 106) is not answered. This may be due to the remote system being down/offline or due to communications failure. Various approaches for dealing with such errors may be employed. In the present disclosure, the timeouts are handled in a similar manner which will be described here. Timeouts are handled by defining a timeout wait period and a maximum tries value, and maintaining a timeout counter. The timeout wait period defines the amount of time that is waited before a request is deemed to have timed out. The maximum tries value defines the maximum number of times a given operation will be tried (1 or more) before abandoning any further attempts (at least in the present processing cycle). The timeout counter tracks the number of times an operation has been tried without success. While the general timeout process is the same for all timeouts, the associated variables may differ—i.e. different timeouts may have different wait periods and/or different maximum retry values. By way of example, for most operations involving a remote system call a suitable wait period is 30 seconds and a suitable maximum number of tries is 5, though alternative values could of course be used.

Where a timeout is encountered after trying to perform a particular operation, the process waits for the timeout wait period. If the timeout wait period expires without the operation being completed (e.g. without receiving a response from the remote system), the current value of the timeout counter is incremented and compared to the maximum tries value applicable to the timeout. If the incremented value of the timeout counter is greater than or equal to the maximum tries value, no further attempts to perform the operation in question are made (indicated by the 'fail' path in the flowcharts). Conversely, if the incremented value of the timeout counter is less than the maximum tries value, a further attempt to perform the operation in question is made (indicated by the 'retry' path in the flowcharts).

If at step 7010 no response is received from the search engine system 106 (i.e. all permitted attempts to retrieve the index state descriptor time out), the method proceeds to step 7602 of FIG. 7G (described in detail below) to see if the event should be re-queued.

If at step 7010 a response to the request for the index state descriptor is received from the search engine system 106, the response is processed at step 7012. The response will either include the index state descriptor requested at 7008, or a message indicating that no index state descriptor for the repository in question exists. It will be appreciated that a response at 7012 indicating that the requested index state descriptor does not exist is different to a timeout at 7010 (in which case no response has been received from the search engine system 106 and it cannot be determined whether the requested index descriptor exists or not).

If, at 7012, the response indicates that the requested index state descriptor does not exist, the method proceeds to step 7502 where a new indexing process is performed (described below with reference to FIG. 7F). If, at 7012, the index state descriptor is returned by the search engine system 106, the method proceeds to step 7014.

At step 7014 the indexing process examines the value of the 'IndexRetries' field in the index state descriptor and compares this value with a maximum index retries value. A suitable maximum index retries value is 5, though alternative values could be used. If the value of the IndexRetries field is greater than or equal to the maximum index retries value, the indexing process determines that indexing for this particular event descriptor has been attempted too many times and the process ends.

However, if at 7014 the value of the IndexRetries counter is less than the maximum index retries value, the method proceeds to step 7016 where the indexing process generates and communicates a request for SCM state of the repository to which the event descriptor relates from the SCM system 102. As noted above, in the Git context the request for the SCM state of a repository is a request for the latest commitID recorded against that repository.

In some embodiments, the synchronization system 104 may be configured to index the main/default branch of repositories only. In such embodiments, the indexing process may request for the SCM state of the default branch of the repository. At step 7018, the synchronization system 104 determines whether the received SCM state of the repository indicates that a change was made to the main/default branch or not. In other embodiments, this step may be skipped and the method may directly proceed to step 7022.

If, at 7018, the SCM state of the repository indicates a no changes have been made to the main/default branch of the repository (or that no default branch is configured or exists (repository is empty)), the SCM system 102 informs the synchronization system 104 of this. The method 7000 ends at this stage and the event descriptor is discarded.

On the other hand, if the SCM state of the repository indicates that changes have been made to the default branch of the repository, the method proceeds to step 7022.

At 7022 the indexing process compares the SCM state (requested from the SCM system 102 at 7016) with the indexed state (from the index state descriptor retrieved at 7012) to determine whether any updating of the search engine version of the repository is required.

By retrieving the SCM state (e.g. the latest commitID) from the SCM system 102 after communication is established with the search engine system 106 and not when the event is first received at the event notification module 302, the synchronization system 104 is able to process events out of order or even simultaneously. For example, consider the situation where descriptors for two events (events 1 and 2) related to repository A are in the queue. Event 1 had occurred before event 2. If the indexing module 306 is processing the event descriptor for event 2 before it has successfully processed the event descriptor for event 1 (e.g., because event 1 was not successfully indexed previously and had to be re-queued), it will synchronize the state of repository A in the search engine system 106 with the latest state of repository A in the SCM system 102 (and not the state of the repository when event 2 had occurred). If the indexing module 306 subsequently processes the event descriptor for event 1, the indexing module 306 will simply retrieve the SCM state of the repository (e.g. the latest commitID) from the SCM system 102, compare it with the indexed state as recorded in the index state descriptor, and (unless still further changes were made to the SCM repository) determine that repository A does not require indexing because the indexed state of the repository is the same as the SCM state of the repository.

If, at 7022, the SCM state of the repository matches the indexed state of the repository, the indexing process determines that indexing is not required. In this case the event descriptor is discarded and the method ends.

Figure 7A:
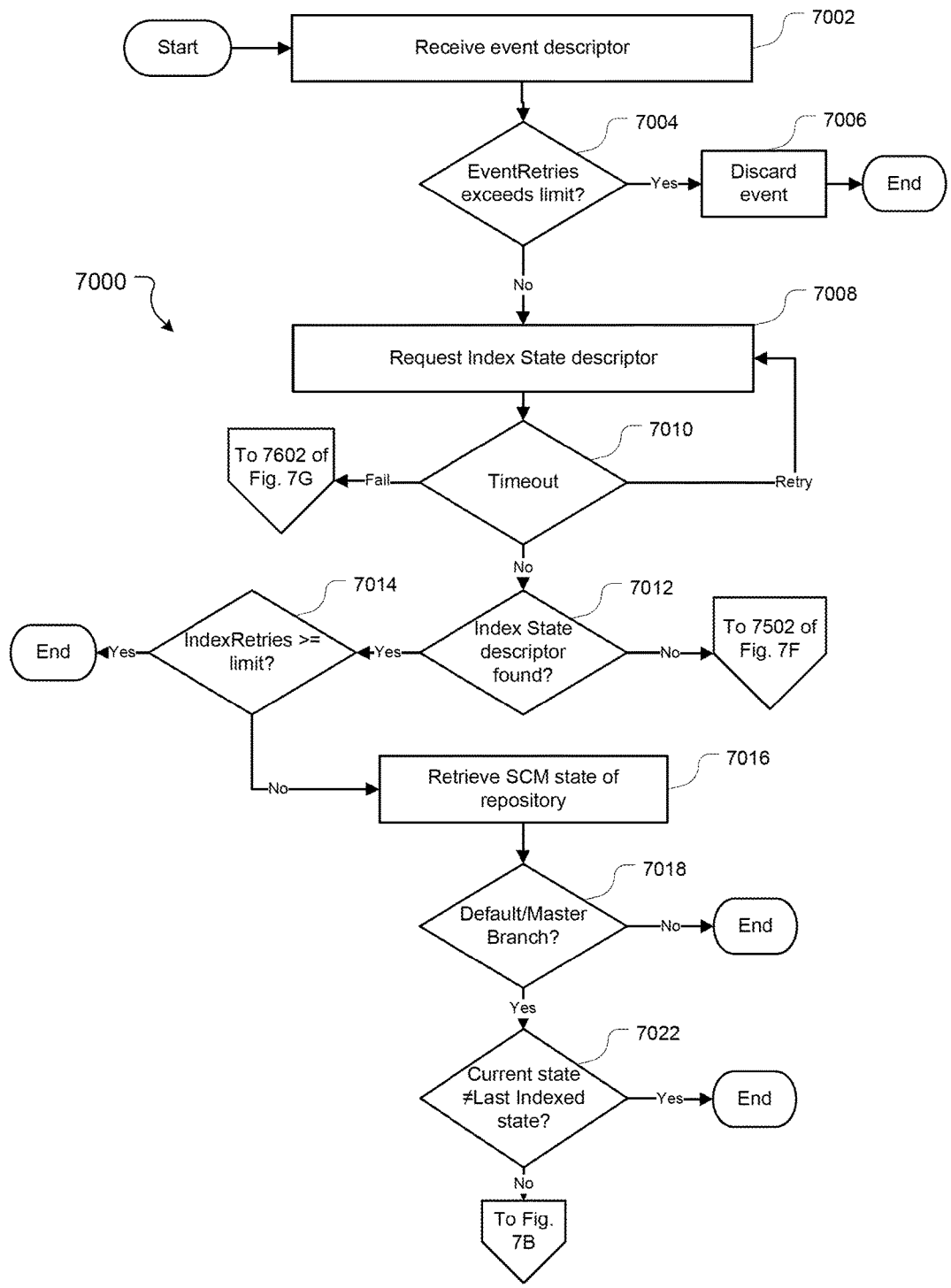
FIGS. 7A-7I are flowcharts illustrating a method for synchronizing content of a search engine system with a particular state of a SCM system repository.
Figure 7B:
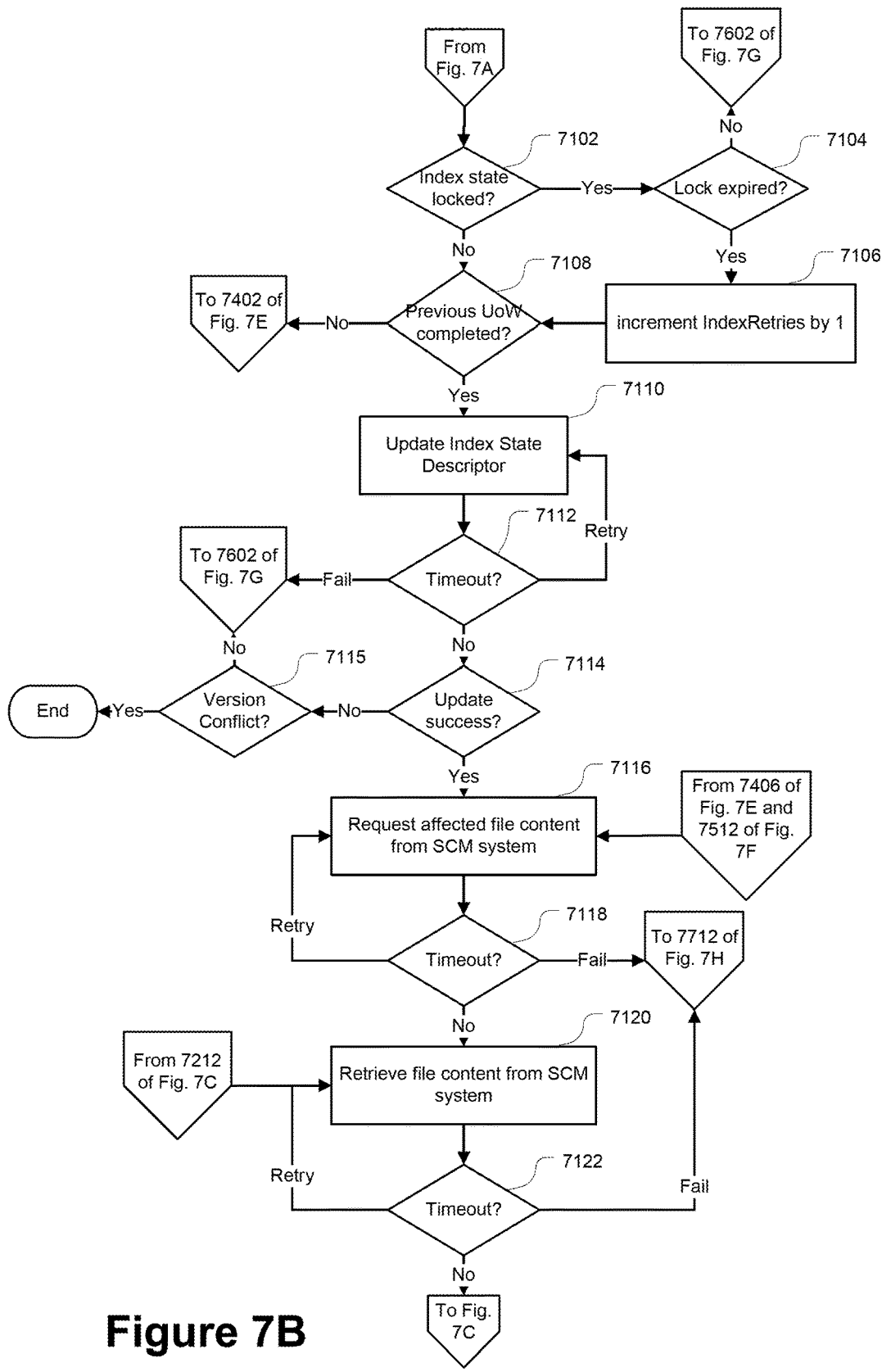

If, at 7022, the SCM state and indexed state of the repository are different, indexing is required and the method proceeds to step 7102 of FIG. 7B to determine whether the index state descriptor is locked.

When an indexing process is in the course of indexing a particular repository, the indexing process sets a lock (using the locked field of the index state descriptor, as described at step 7110 below). This prevents more than one indexing processes from trying to concurrently update the same repository.

If, at 7102, the locked field of the index state descriptor is set to 'lock' the method proceeds to step 7104. At step 7104, the indexing process determines whether the lock is valid or has expired. In one embodiment this involves the indexing process calculating the difference between the event timestamp (from the event descriptor) and the lock timestamp (from the index state descriptor). If the difference between the two timestamps is less than a predetermined lockout duration, the lock is considered valid. Otherwise the lock is considered to have expired.

Figure 7C:
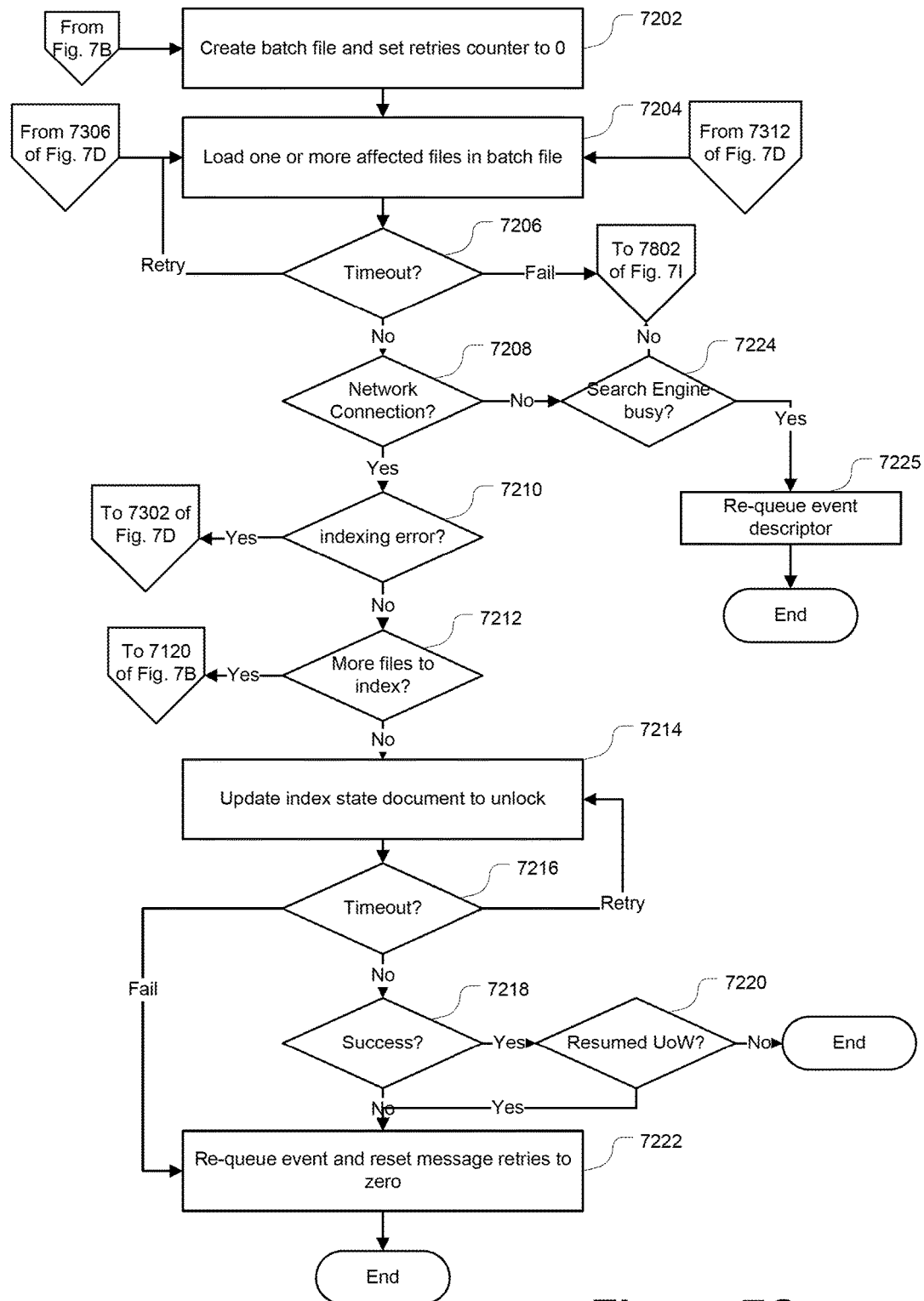
Figure 7D:
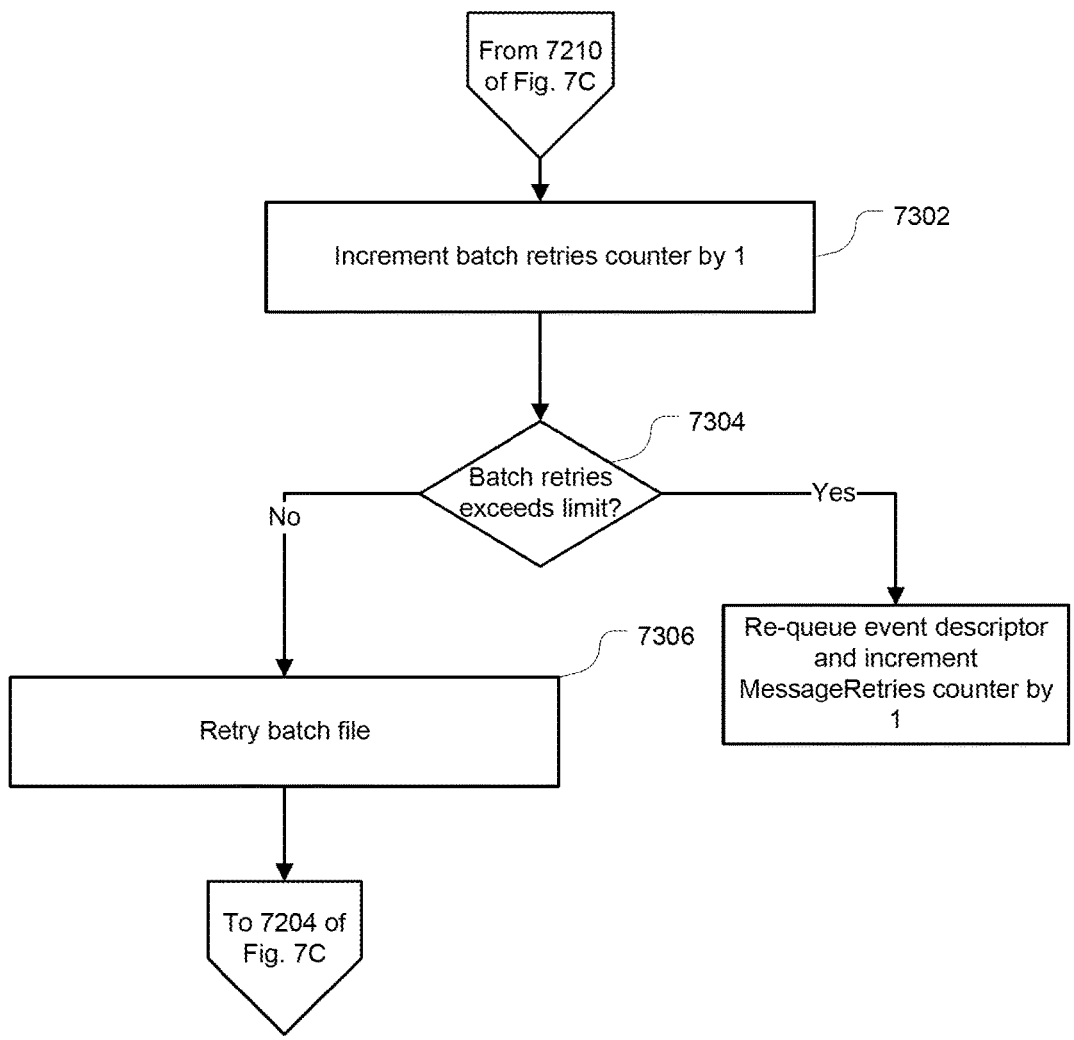
Figure 7E:
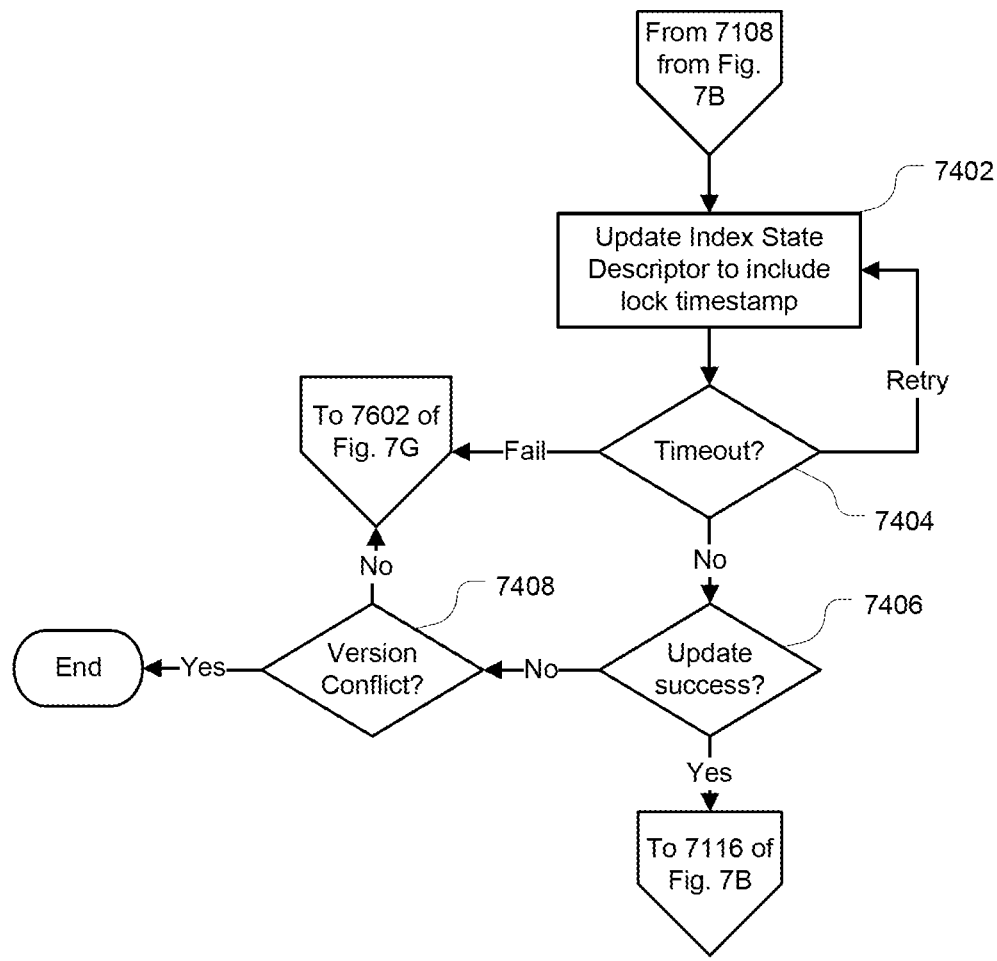
Figure 7F:
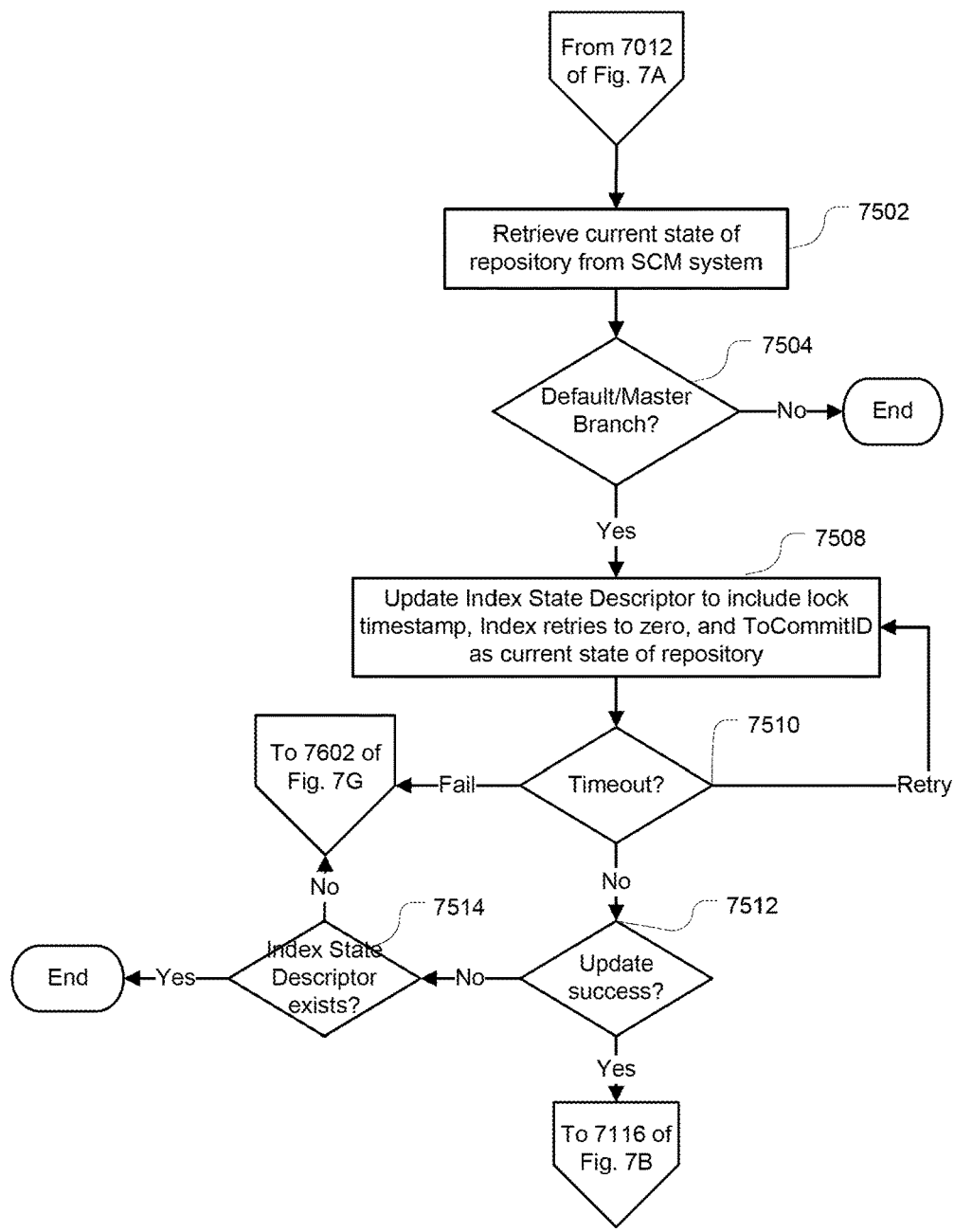
Figure 7G:
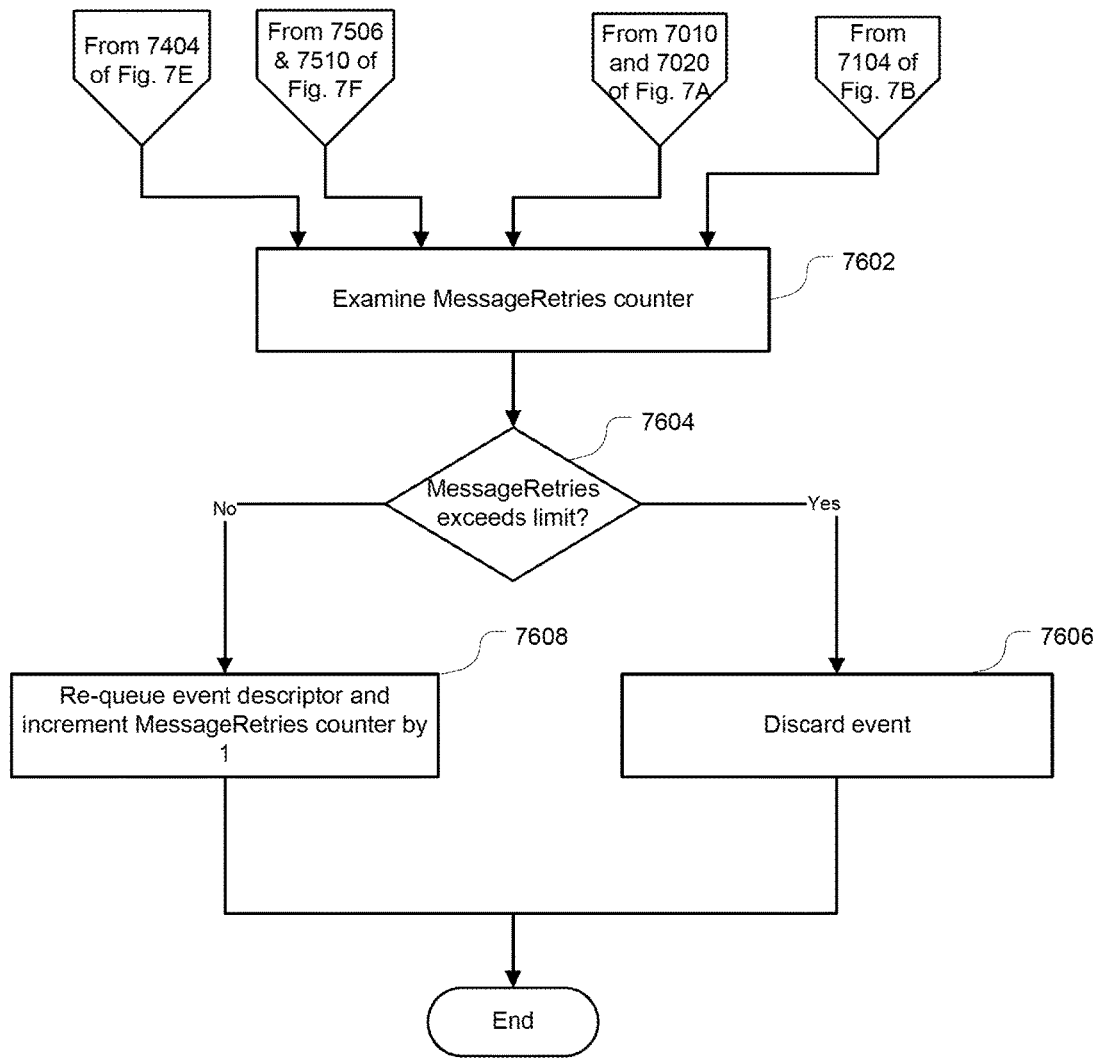

If, at 7104, the lock is valid (and has not expired), the method proceeds to step 7602 of FIG. 7G to see if the event should be re-queued or not.

If, at 7104, the lock has expired, the method proceeds to step 7106. At 7106 the indexing process records that the next time the index state descriptor is updated on the search engine system 106 (e.g. at 7110 or 7402) the IndexRetries counter is to be incremented. The method then proceeds to step 7108.

Returning to step 7102, if the locked field of the index state descriptor is not set, the method proceeds to step 7108 where the indexing process determines whether the index state descriptor includes a target state identifier (e.g. a 'ToCommitID'). If the index state descriptor includes a target state identifier this indicates that a previous indexing attempt with respect to the repository was aborted midprocess. The indexing module stores this target state identifier in memory until the indexing process is completed or aborted. If a target state identifier exists, the method proceeds to step 7402 of FIG. 7E, where instead of attempting to process the current unit of work (as defined by SCM state retrieved at 7020) the aborted unit of work (as defined by the target state identifier) is retried.

However, if at 7108 the index state descriptor does not indicate that a previous indexing attempt was aborted midprocess, the method proceeds to step 7110.

At step 7110, the indexing process attempts to update the index state descriptor for the repository on the search engine system 106. This involves trying to write to the index state descriptor a lock time stamp (to lock the descriptor and record the time at which the lock was acquired). It also involves recording the SCM state as the target state by updating a target state identifier (indicating the target state for the unit of work being performed). If the index state descriptor was locked, but the lock had expired, the indexRetries counter is also incremented (see step 7106 above).

As noted, in the Git example the target state identifier is the commitID returned by the SCM system 102, which represents the repository state the indexing process is trying to synchronize the search engine system's version of the repository to. The target state identifier is added to the index state descriptor so that if the indexing process fails midway, the next time the index state descriptor is retrieved for indexing, the indexing module knows that the previous attempt had failed and can retry the previous attempt.

When trying to update the index state descriptor at a timeout error may occur (step 7112). The timeout process is similar to that described above with respect to step 7010. If all permitted attempts at contacting the search engine system 106 timeout, the method proceeds to step 7602 (FIG. 7G) to see if the event should be re-queued.

If a response to the attempt to update the index state descriptor is received from the search engine system 106, the indexing process determines if the update was successful or not at step 7114.

If, at 7114, the attempt to update the index state descriptor was not successful, the indexing process determines at 7115 whether this was due to a version conflict.

Version conflicts may occur if two indexing processes attempt to lock the same index state descriptor simultaneously. For example, consider the situation where two indexing processes (process A and process B) retrieve the same index state descriptor from the search engine system 106.

Indexing process A manages to write the lock information described above to the index state descriptor and return the index state descriptor to the search engine system 106. Before storing the index state descriptor, the search engine system 106 increments the version number of the index state descriptor from, for example, version 3 to version 4. Subsequently, when process B returns the same index state descriptor with lock information to the search engine system 106, the search engine system 106 examines the version number in the received index state descriptor and determines that the version number of the index state descriptor received from process B is version 3, but the latest version number of the descriptor in the search engine system is 4. At this stage, the search engine system 106 issues an error message to process B notifying it that it is trying to operate on an index state document that has changed since it was last read by process B.

Accordingly, if an indexing process tries to update an index state descriptor but the search engine system 106 determines that the version of the index state descriptor currently stored is higher than the version of the descriptor received from the synchronization system 104, the search engine system 106 identifies a version conflict and notifies the indexing process that is trying to update the descriptor of this. In this case the indexing process ends.

If, at 7115, the error is not a version conflict error, but some other type of error, such as InternalServerError, TransportException, ConnectionError, the method proceeds to step 7602 (FIG. 7G.) to determine if the event should be re-queued.

Figure 10:
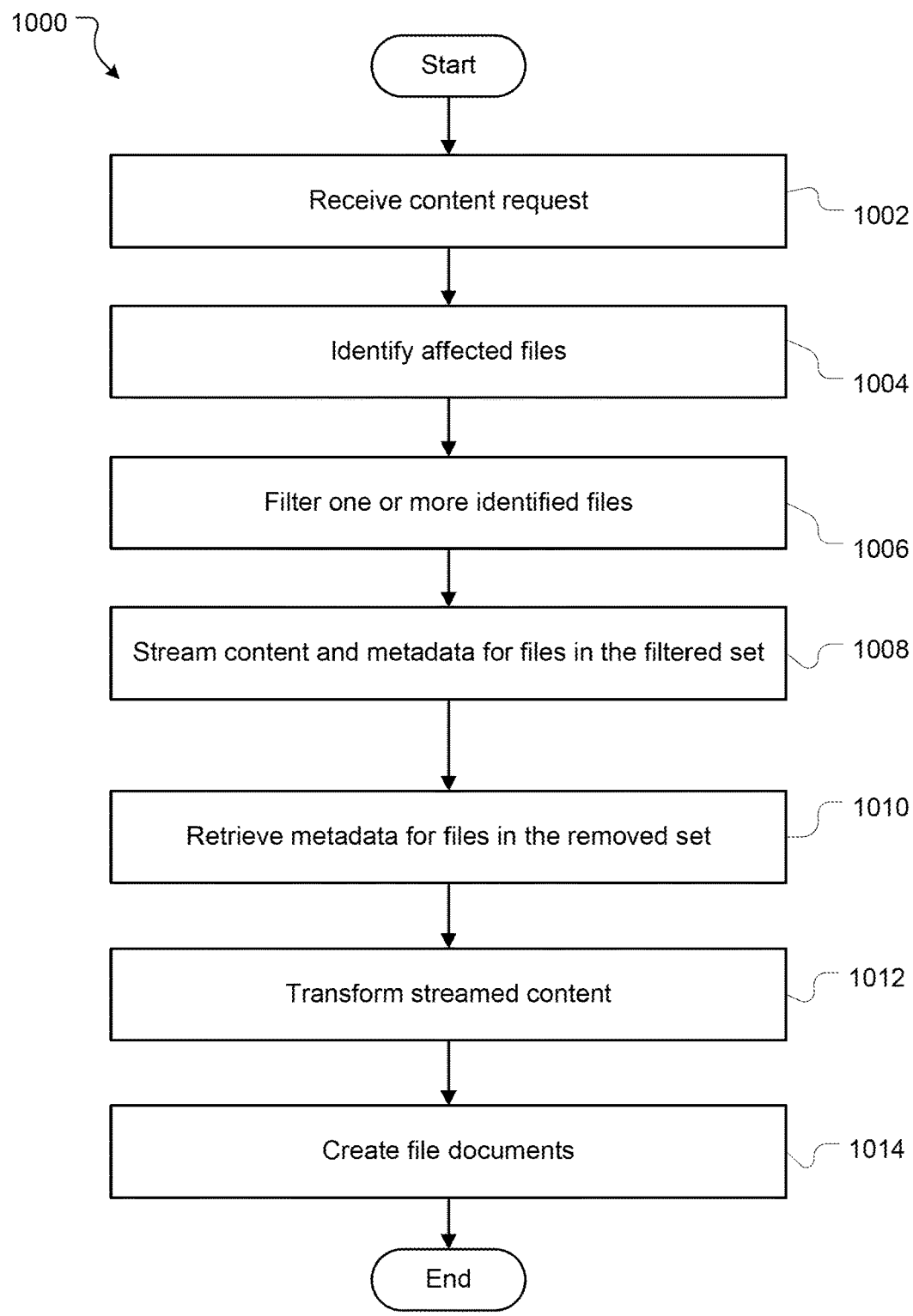
FIG. 10 is a flowchart illustrating a method for extracting content from a SCM system.

If the indexing process successfully updates the index state descriptor (i.e. the process does not time out at 7112 and the update is a success at 7114), the method proceeds to step 7116. At 7116 the synchronization system 104 generates and forwards a content request to request the SCM system 102, asking the SCM system 102 to identify and send files that have changed from the SCM state (i.e. the repository state retrieved from the SCM system 102 at 7020) to the indexed state of the repository (i.e. retrieved from the index state descriptor). FIG. 10 describes the content acquisition process in detail.

A timeout (7118) is applied to the request to the SCM system at 7116. If all permitted attempts to contact the SCM system 102 fail, the method proceeds to step 7702 (FIG. 7H) to try and unlock the index state descriptor and see if the event should be re-queued.

Alternatively, if the request at 7116 does not time out, the synchronization system 104 begins to receive a stream of the requested file content from the SCM system 102 at step 7120. The connection between the SCM system 102 and the indexing module may terminate during the file streaming process. If this happens, the indexing module may not retrieve all necessary files. In this case, the indexing module may try to reestablish connection and retrieve the files a predetermined number of times. If it is unable to reestablish a connection and/or retrieve all the affected files, the method proceeds to step 7702 (FIG. 7H) to try and unlock the index state descriptor and see if the event should be re-queued.

If the files are successfully streamed and received by the synchronization system 104, the method proceeds to step 7202 (FIG. 7C).

To increase indexing speed and reduce the number of API calls to update multiple files, the indexing module 306 may be configured to combine multiple files into a single batch file. The batch file can then be sent to/indexed in the search engine system 106 through a single API call. The number of files that are combined to form the batch file can be varied and may depend on the combined size of the files or the number of files. For example, the indexing module may configure a total size threshold (e.g., 10 Megabyte) and/or a file quantity threshold (e.g., 1000 files) to stop adding files to the batch file. In another embodiment, the number of files that are combined to form a batch file may depend on the size of the files and the number of files. If a size threshold is reached before a number threshold, the batch file may be capped based on the size of the batch file and if a number threshold is reached before the size threshold, the batch file may be capped based on the number of files in the batch file.

At step 7202 (FIG. 7C), the indexing process creates a batch file. To assist with communicating the batch file to the search engine system 106, the indexing process maintains a batch retries counter which is initialized to zero.

At step 7204 the indexing process attempts to add files to the batch file. A timeout (step 7206) is applied to this process. If the predetermined number of tries fail, the method proceeds to step 7802 (FIG. 7I) to try and unlock the index state descriptor and potentially re-queue the event.

If the indexing process is successful in adding the required files to the batch file, the indexing process then determines if it has an active network connection to the search engine system 106 at step 7208. If a network connection is active, the indexing process forwards the batch file to the search engine system 106 for indexing (e.g. via an API call).

At 7210 the indexing process determines if any files failed to be indexed. In one embodiment, the search engine system 106 returns a report containing the status of each file in the batch file. The indexing process then determines if any files failed to be indexed by comparing the number of file statuses returned in the report with the number of files sent in the batch file. If the numbers do not match, the indexing process determines that one or more files failed to be indexed.

If, at 7210, all files in the batch file are determined to have been successfully indexed in the search engine system 106, the method proceeds to step 7212 where the indexing module determines if there are any other files remaining to be indexed (e.g., files that could not be added to the previous batch file). If more files exist, the indexing module repeats steps 7204-7212 until all files have been indexed.

If, at 7212, there are no more files to be indexed, the indexing process attempts to unlock the index state descriptor at step 7214. Unlocking the index state descriptor involves: updating the lock field to reflect that the index state is no longer locked (e.g. by clearing the lock timestamp field); copying the contents of the target state field to the indexed state field; clearing the target state information (i.e., the target state field); and resetting the IndexRetries counter to zero.

A timeout (step 7216) is applied to the update operation of step 7214. If all permitted attempts time out, the process proceeds to step 7222.

If the update request of 7214 does not timeout, the process determines whether the index state descriptor was successfully updated at step 7218. If not, the method proceeds to step 7222. If the index state descriptor is successfully updated, the method proceeds to step 7220 to determine whether the indexing process is in respect of resumed unit of work that had previously been stopped mid-process (and, accordingly, was operating to synchronize the search engine repository to the target state rather than the SCM state). This determination may be made by inspecting the memory to check whether a target state identifier was stored at step 7108.

If, at 7220, the indexing process was not in respect of a resumed unit of work (i.e., no target state identifier was found in the memory), the indexing process ends.

On the other hand, if at step 7220 it is determined that the indexing process was in respect of a resumed unit of work (i.e., a target state identifier was stored in the memory), the method proceeds to step 7222.

At step 7222, the event is passed to the queueing module 305 to be re-queued. An exponential back-off time delay may be applied to the re-queuing process. In addition, the EventRetries counter of the event descriptor is reset to zero before the indexing process ends.

Returning to step 7208, if it is determined that the synchronization system 104 cannot establish a connection with the search engine system 106, the method proceeds to step 7224 where it is determined whether the search engine system 106 is busy.

If, at 7224, the search engine system 106 is determined to be busy, the method proceeds to step 7225 to re-queue the event without incrementing the IndexRetries counter. The IndexRetries counter is not incremented at this step as the batch file upload did not fail at this stage. Rather, the search engine system 106 is merely busy.

If, at 7224, the search engine system 106 is not determined to be busy (indicating that the system has encountered some other fault, e.g. a loss of network connectivity or an internal search engine system error), the method proceeds to step 7802 (FIG. 7I) to increment the IndexRetries counter, unlock the index state descriptor and, potentially, re-queue the event.

FIG. 7D illustrates the steps performed if one or more files were not indexed successfully at step 7210 (FIG. 7C).

At step 7302 the indexing module increments the batch retries counter.

At step 7304, the value of the batch retries counter is compared with a threshold number for batch retries to determine whether too many attempts have been made for the batch. If the value of the batch retries counter value has not exceeded the threshold number, the method proceeds to step 7206 of FIG. 7C, where the indexing process retries to index the batch file.

Figure 7H:
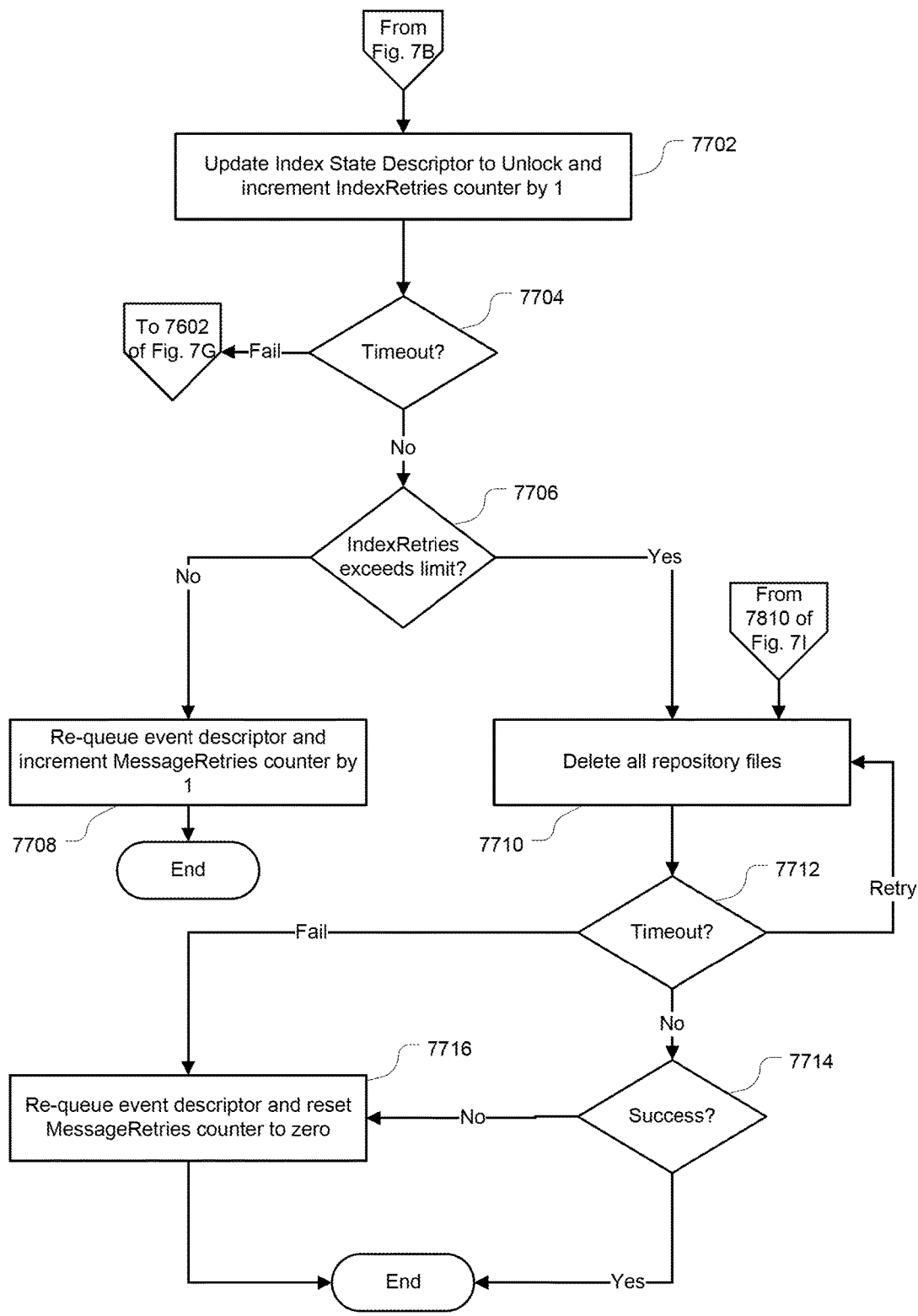

However, if the value of the batch retries counter exceeds the threshold number of batch retries, the method proceeds to step 7702 of FIG. 7H, where the event descriptor is unlocked, the IndexRetries counter is incremented by 1, and the event is requeued.

FIG. 7E illustrates the steps performed if an indexing process determines that a previous indexing attempt with respect to the repository was aborted mid-process, as determined at step 7108 (FIG. 7B). The steps performed in this case are very similar to the steps performed if a previous indexing attempt was not aborted (i.e. steps 7110 to 7115 of FIG. 7B), with the exception that when the index state descriptor is updated a target state identifier (e.g. a ToCommitId) is not added/changed. This reflects the fact that in this case there will already be a target state identifier in the index state descriptor (processing in respect of which was previously aborted). Given the similarity of the steps shown in FIG. 7E to those already described, a brief description only will be provided.

At step 7402 (similar to step 7110 of FIG. 7B), the indexing process attempts to update the index state descriptor. In the present case this involves setting a lock time stamp and, if required from step 7106 (FIG. 7B), incrementing the IndexRetries counter. As noted, the target state identifier field is not updated/changed.

A timeout error is checked for at 7404 (similar to step 7112 of FIG. 7B). If all permitted attempts timeout, the method proceeds to step 7602 (FIG. 7G) to see if the event should be re-queued.

If a response is received from the search engine system 106, the indexing process determines if the update was successful or not at step 7406 (similar to step 7114 of FIG. 7B).

If, at 7406, the attempt to update the index state descriptor was not successful, the indexing process determines at 7408 (similar to step 7115 of FIG. 7B) whether this was due to a version conflict. If so, the indexing process ends. If not, the method proceeds to step 7602 (FIG. 7G.) to determine if the event should be re-queued. If on the other hand, the update was successful, the method proceeds to step 7116 of FIG. 7B to perform an aborted indexing process.

FIG. 7F is a flowchart illustrating a new indexing process performed when the search engine system 106 does not have an index state descriptor for the repository in question (i.e. no index state descriptor is found at step 7012 of FIG. 7A). In certain embodiments, this may be because a repository is newly created in the SCM system 102 and has not yet been indexed in the search engine system 106. Alternatively, it may be because the search engine version of the repository was previously deleted because of an unsuccessful indexing operation. Accordingly, the indexing process attempts to index the entire contents of the SCM repository here.

Many of the steps that are performed in this case are similar to steps already described above. Where steps are similar (or the same) as those described above the corresponding steps will be indicated and they will be described in brief only.

Steps 7502, 7504 and 7506 of FIG. 7F are the same as steps 7016, 7018, and 7020 of FIG. 7A respectively.

At 7502 a request for the SCM state of the repository is sent to the SCM system 102.

Next, at step 7504, the indexing process receives a response to the SCM state query and determines whether the SCM state corresponds to a default branch and/or if a default branch exists in the repository. If the SCM state does not correspond to the default branch or no default branch exists, the process ends.

If a default branch does exist, the method proceeds to step 7508 where an attempt to create an index state descriptor is made. Specifically, at 7508 the indexing module creates a locked index state descriptor for the repository. To this end, the index state descriptor includes: the repository ID, a lock field and timestamp, and an IndexRetries counter (set to zero). The SCM state identifier returned from the SCM system 102 is added as the target state identifier (i.e., 'ToCommitID'). The indexing process then tries to upload the index state descriptor to the search engine system 106. If the connection with the search engine system 106 times out a predetermined number of times (step 7510), the method proceeds to step 7602 (FIG. 7G) to re-queue the event.

Alternatively, if the connection with the search engine system 106 is successful, the method proceeds to step 7512 where the indexing process determines if the index state descriptor was successfully created in the search engine system 106. If yes, the method proceeds to step 7116 (FIG. 7B) to perform the indexing process. Otherwise, the method proceeds to step 7514, where the indexing module determines whether an index state descriptor already exists for repository in the search engine system 106. By way of example, this may happen if two indexing processes attempt to create and upload an index state descriptor for the same repository in the search engine system 106, both setting the version field to 1. The search engine can successfully create only one index state descriptor with version 1. The other index state descriptor fails.

If, at 7514, an index state descriptor still does not exist, the method proceeds to step 7602 (FIG. 7G) to re-queue the event. However, if it is determined at 7514 that another indexing process has already created and successfully uploaded an index state descriptor in the search engine, the method ends as the indexing module assumes that the other indexing process is processing that event.

FIG. 7G illustrates the steps involved in re-queuing an event descriptor. This process is performed at various stages of the process described above with reference to FIGS. 7A-7F. For example, the re-queuing process is generally invoked when an action times out.

The re-queuing process begins at step 7602, where the indexing process examines the EventRetries counter in the event descriptor.

At step 7604 it is determined whether the EventRetries counter exceeds a threshold value.

If the EventRetries counter value is greater than or equal to the threshold value the method proceeds to step 7606 where the event is discarded or placed in a dead letter queue and the process ends.

If, at 7608, the EventRetries counter value is less than the threshold value, the method proceeds to step 7608. At 7608 the EventRetries counter of the event descriptor is incremented by one. The event descriptor is also passed to the queueing module 305 to be re-queued. An exponential back-off time delay may be applied to the re-queuing process. The method then ends.

FIG. 7H illustrates the steps performed to re-queue an event if retrieving content from the SCM system 102 is unsuccessful/times out (i.e. at 7118 or 7122 of FIG. 7B). At step 7702 the indexing process attempts to update the index state descriptor by removing the lock timestamp and incrementing the indexRetries counter. If the unlocking attempt times out at step 7704, the method proceeds to step 7602 of FIG. 7G.

If the unlocking attempt does not time out at step 7704, the indexing module determines if the indexRetries count in the index state descriptor exceeds a threshold value at 7706.

If at 7706 the indexRetries count is greater than or equal to the threshold value, the method proceeds to step 7710 where the indexing module attempts to delete all files for the repository from the search engine system 106. This effectively 'resets' the repository on the search engine system 106 to allow synchronization of the repository to start afresh (e.g. as if the repository had never been indexed). If all allowed attempts to delete the repository files time out, the method proceeds to step 7716. At 7716 the event type of the event descriptor is updated to a 'delete event' and the event retries counter is reset to zero. The event is then re-queued before the process ends. When the indexing module subsequently retrieves the event from the queuing module, it may perform a process as exemplified by FIG. 9.

If the deletion operation does not time out at 7712 the indexing process determines whether the deletion operation was successful at step 7714. If the deletion operation was successful the method ends. Otherwise, the method proceeds to step 7716.

Figure 7I:
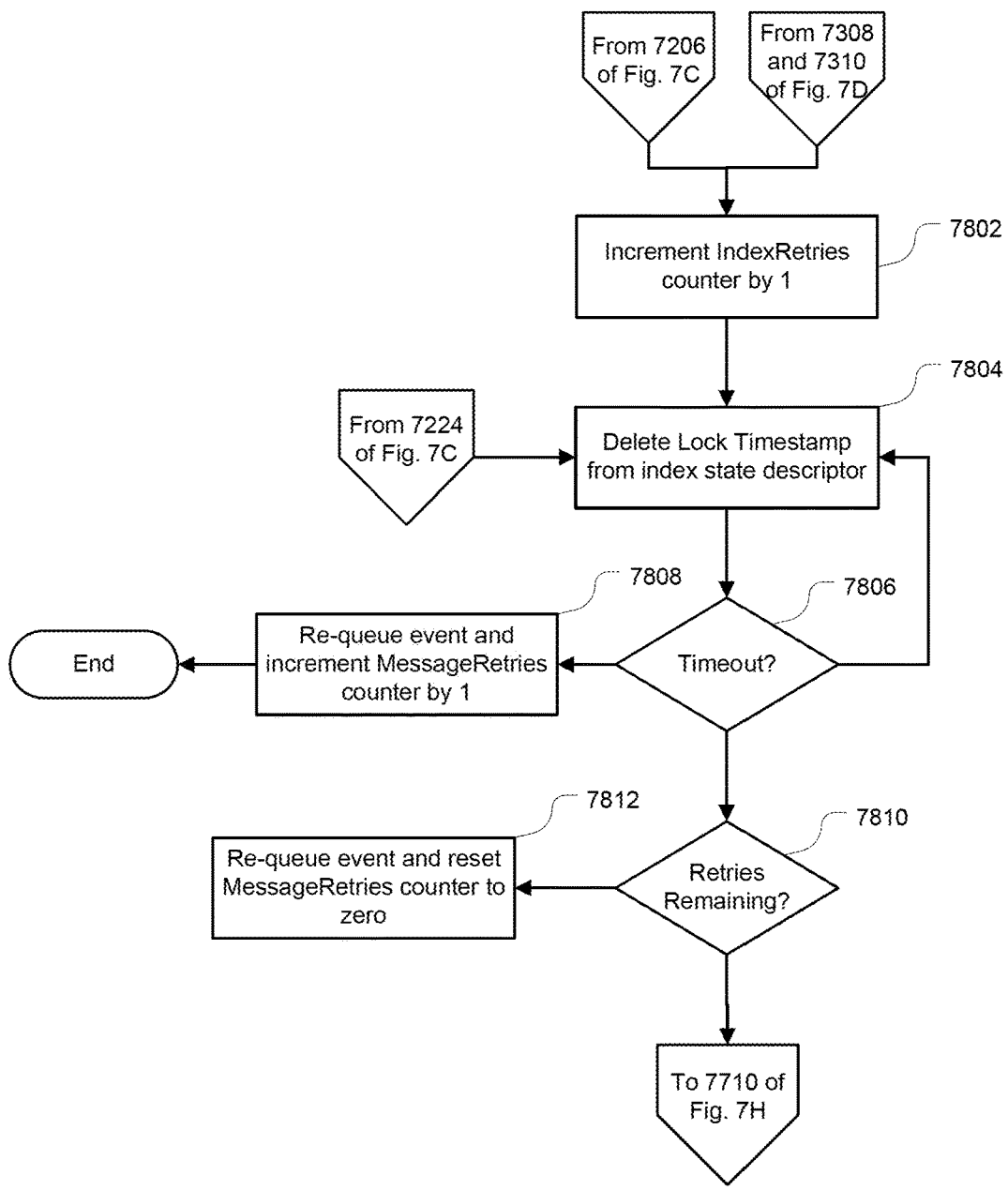

FIG. 7I is a flowchart illustrating the steps involved in unlocking index state descriptor. The method begins either at step 7802 (in case the process continues from step 7206 of FIG. 7C or steps 7308 or 7310 of FIG. 7D) or at step 7804 (in case the process continues from step 7224 of FIG. 7C).

At step 7802, the indexing process records that the next time the index state descriptor is updated on the search engine system 106 (e.g. at 7804)) the IndexRetries counter is to be incremented.

At step 7804, the indexing process attempts to update the index state descriptor. This involves removing the lock (e.g. by deleting the lock timestamp) and incrementing the IndexRetries counter (per the update recorded at 7802).

If, at 7806, the allowed number update attempts time, the EventRetries counter is incremented and the event is passed to the queueing module 305 to be re-queued at 7808. An exponential back-off time delay may be applied to the re-queuing process.

Alternatively, if the index state descriptor is updated successfully, the method proceeds to step 7810, where the indexing process examines the indexRetries counter to determine whether any retries remain. If no retries remain, the method proceeds to step 7710 (FIG. 7H) to delete the repository files from the search engine system 106 and potentially re-queue the event.

If, at 7810, retries remain, the method proceeds to step 7812. At 7812 the EventRetries counter is reset to zero and the event is passed to the queueing module 305 to be re-queued at 7808. An exponential back-off time delay may be applied to the re-queuing process.

It will be appreciated that the steps of process 700 (illustrated in FIGS. 7A-7I) can be reordered without departing from the scope of the present disclosure. For example, the indexing process may perform the steps of determining whether an index state descriptor is locked (i.e., steps 7102-7106) before retrieving the SCM state of the repository at step 7016. In this case, if the indexing process determines that the index state descriptor is locked and the lock has not expired, the event descriptor may be requeued. However, if the index state descriptor is not locked or if the lock has expired, the indexing process proceeds to retrieve the SCM state of the repository from the SCM system.

In another example, the indexing process may determine whether the index state descriptor includes target state information (i.e., step 7108, 'previous UoW completed?') before retrieving the SCM state of the repository at step 7016. In this case, if the index state descriptor includes the target state information, the indexing process may bypass steps 7016-7022 and directly determine whether the index state descriptor is locked at step 7102. If, on the other hand, target state information is absent, the method proceeds to step 7106 to retrieve the SCM state of the repository. It will be appreciated that the method steps may be reordered in any other suitable manner as well.

Example Indexing Processes: Repository Modification Event

Figure 8:
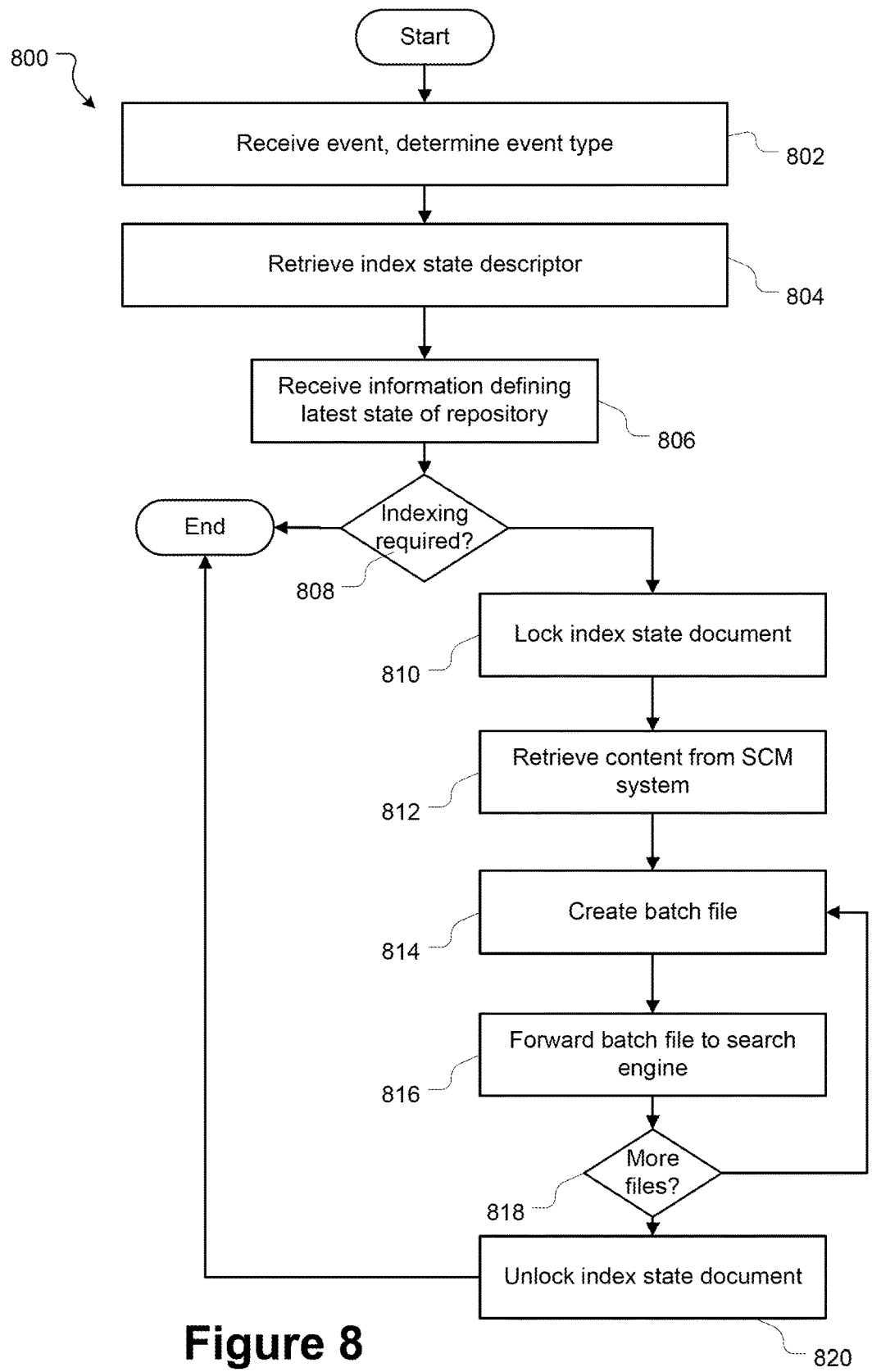
FIG. 8 is a flowchart illustrating a method for modifying content in a search engine system.

FIG. 8 illustrates indexing steps performed in response to a repository modification event. For clarity, the process illustrated with respect to FIG. 8 assumes that no errors are encountered during indexing—i.e. all requests to retrieve/upload data to the SCM system 102 and search engine system 106 work, the index state descriptor for the repository in question is not locked, and the index state descriptor does not include a target state identifier (which, if present, would indicate that an indexing process with respect to the repository had been started but abandoned). Accordingly, all the error checking/handling considerations are omitted from these figures and the corresponding description.

At step 802, the queuing module 305 receives an event descriptor and identifies the type of event therefrom. In this example, the event type is a repository modification event. Based on the event type, the queuing module 305 places the repository modification event in an appropriate queue and, eventually, delivers the event to the indexing module.

At step 804, an indexing process is launched to process the repository modification event. The indexing process extracts the repository identifier from the event descriptor and using the identifier retrieves the index state descriptor for that repository from the search engine system 106. From the retrieved index state descriptor the indexing process determines the indexed state of the repository.

At step 806, the indexing process retrieves the SCM state of the repository from the SCM system 102.

At step 808, the indexing process compares the indexed state of the repository to the SCM state of the repository to determine whether indexing is required. If the two states match, indexing is determined not to be required and the indexing process ends. If the states do not match, indexing is determined to be required and the method proceeds to step 810.

At step 810, the indexing process updates index state descriptor on the search engine system 106. This involves setting the lock (e.g. by writing a lock timestamp) and recording the SCM state (obtained at 806) as the target state identifier.

At step 812, the content required to update the indexed state of the repository to the SCM state of the repository is retrieved from the shared file server 110. To this end, the indexing process sends a content request to the content acquisition module 308 to retrieve the content of the repository that is modified (i.e., amended, deleted or added files). The content acquisition module 308 provides the SCM state and the indexed state to the SCM system 102, which in turn identifies all the changes in the repository from the indexed state to the SCM. The SCM system 102 then forwards all affected repository files to the content acquisition module 308, which forwards them to the indexing module 306.

At step 814, the indexing module 306 creates file descriptors for the files received from the acquisition module 308 and batches those file descriptors into a batch.

At step 816, the batch file is sent to the search engine system 106. The search engine system 106 receives the batch file, retrieves the individual file descriptors from the batch file, and updates its stored content and inverted index accordingly.

At step 818, the indexing process determines whether any more files need to be forwarded to the search engine system 106. If more files exist, the method steps 814 and 816 are repeated until all the files have been sent to the search engine system 106. If no more files remain, the indexing process proceeds to step 820.

At step 820 the indexing process updates the index state descriptor to remove the lock (e.g. by deleting the lock timestamp), change the indexed state identifier to the target state identifier, and delete the target state identifier. The process then ends.

Example Indexing Processes: Repository Deletion Event

Figure 9:
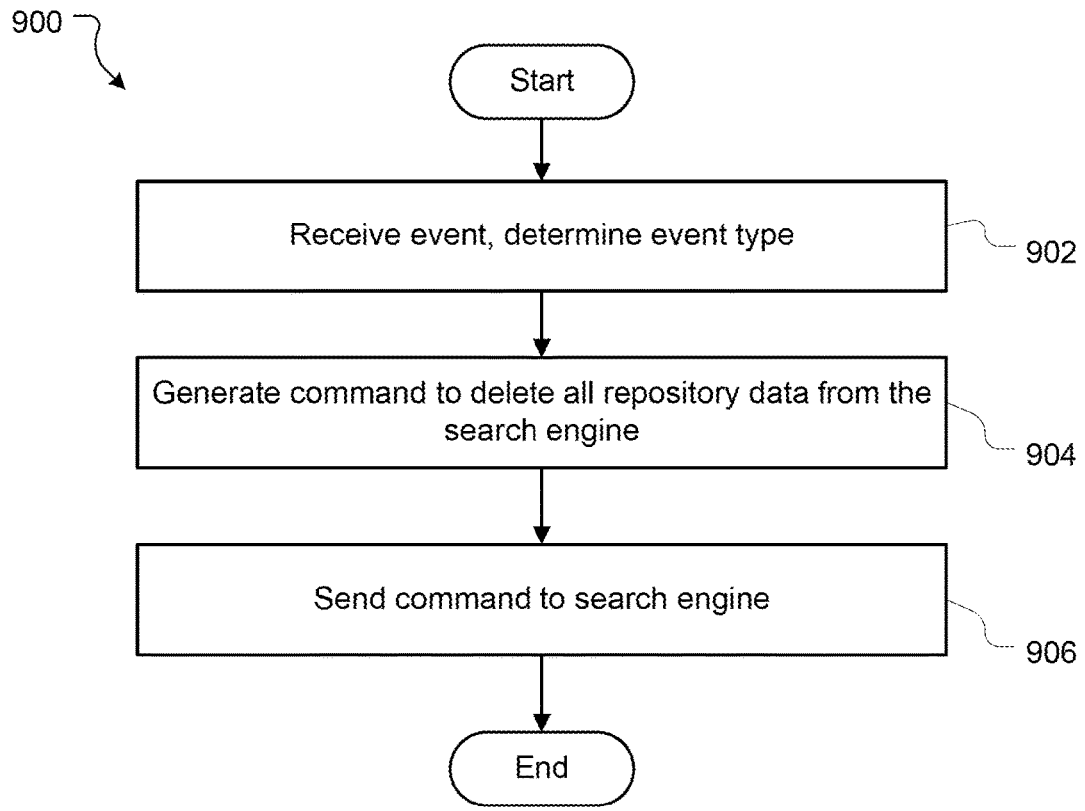
FIG. 9 is a flowchart illustrating a method for deleting content from a search engine system.

FIG. 9 illustrates the indexing steps performed for a repository deletion event. As with FIG. 8, the process shown in FIG. 9 assumes that no errors are encountered.

At step 902, the queuing module 305 receives an indexing event descriptor and identifies the type of event from the event descriptor. In this example, the event is a repository deletion event. Based on the event type, the queuing module 305 places the repository deletion event in the queue for a suitable indexing process.

At step 904, an indexing process is launched to handle the deletion event. As the event is a repository deletion, the indexing process generates a command for deleting all data for to the repository from the search engine system 106. Specifically, the indexing process may request the search engine system 106 to:

1. Delete the corresponding repository content (includes all files and metadata) from the database 120,
2. Delete the index state descriptor and the repository descriptor, and
3. Delete the repository content from the inverted index.

At step 906, the command is sent to the search engine system 106. The search engine system 106 receives the request and deletes the relevant data.

It will be appreciated that if the deletion request fails, the event descriptor is requeued. The process 900 may be repeated until the repository is successfully deleted from the search engine system 106.

Content Extraction and Transformation

When the synchronization system 104 identifies that a repository needs to be updated in the search engine system 106, the synchronization system 104 operates to determine (with the help of the SCM system 102) the particular files require updating, retrieve those files (and metadata) from the SCM System 102, and prepare file descriptors to be sent to the search engine system 106.

In certain embodiments, the synchronization system 104 (and in particular the content acquisition module 308 and the content adapter module 309) are configured to filter and/or transform the content of the files that are processed/sent to the search engine system 106. Generally speaking, filtering may be performed in order to improve the efficiency of the indexing process, while transformation may be performed to improve the search functionality of the search engine system 106 once the content has actually been indexed.

FIG. 10 illustrates an exemplary method 1000 for extracting files from the SCM system 102, filtering/transforming the content of the extracted files, and preparing file descriptors for indexing by the search engine system 106. Method 1000 is performed, for example, at steps 7116 and 7120 of FIG. 7B.

At step 1002 a content request is received. In one embodiment, the content request is be received by the content acquisition module 308 from the indexing module 306. The content request includes information defining a start state of a repository (e.g. the indexed state, being the state of the repository currently stored on the search engine system 106) and an end state of a repository state (e.g. the SCM state of the repository at the time it was checked).

At step 1004, all affected files from the start state to the end state are identified. In one embodiment, the SCM system may identify these files by performing a diff operation using the indexed state and the SCM state. The output may be a list of files in the repository that have been modified, added, deleted, or renamed.

At step 1006, the identified files are assessed against one or more filters (described below) to determine whether a given file is to be indexed or not. In order to filter the files, the content request may include a filter field including filter information defining one or more filters to be applied is used. Default filters may be defined for all extraction operations, and/or filter information may be included in the request sent to the SCM system 102. Various filters may be applied, some of which are described below.

A file size filter may be used define a threshold (e.g., maximum) file size that will be indexed. The threshold or maximum file size is set with efficiency concerns in mind—i.e. so that an inordinate amount of resources are not committed to indexing unduly large files. By way of example, the maximum file size may be set to 512 KB. If a file exceeds the maximum file size the file is filtered out. As described below, where a file is filtered out it may be excluded from further processing entirely, or a file descriptor for the file may still prepared but with file metadata only (i.e. no file content).

One or more file type filters may be used to define file types that should be excluded from indexing and/or file types that should be included in indexing. For example, a filter may be set to exclude binary or non-text files from indexing (on the basis that unless processed further such a file is not searchable in any event). A binary/non-text file may be identified in various ways. For example, the synchronization system 104 may employ a heuristic approach that involves inspecting the first n bytes/characters of the file content to determine whether a file type identifier (e.g. a magic number) exists. N may be any appropriate number, for example 4 KB. If a file type identifier is found, the SCM system 102 determines the file type based thereon and filters the file accordingly. However, if the SCM system 102 does not identify a file type identifier in the first n bytes, the SCM system 102 inspects up to the first m bytes of the file to check whether it appears to be a suitably encoded file (e.g. a UTF-8, UTF-16 or similarly encoded file). M may be any appropriate number, for example 32 KB. If the file does not appear to be suitably encoded, the file is filtered out.

By way of a further example, a binary file may be identified by inspecting the first n bytes (e.g., 4 KB) for a NULL byte. However, if a NULL byte is not found in the first n bytes, the synchronization system 104 may inspect the up to the first m bytes (e.g., 32 KB) to check whether a NULL byte can be found. If a NULL byte is found, the file is considered to be a binary file and is filtered out.

One or more file status filters may be used to define file statuses which, if identified, lead to the file being filtered in or filtered out. File statuses may include, for example, statuses indicating that a file has been modified, newly added, deleted, renamed, etc. In one example, if the only change made to a file is a file rename, the synchronization system 104 may decide that such files do not require re-indexing, and may therefore filter out such files. Other file properties, such as file permissions (e.g., public or private) could also/alternatively be used as the basis for filtering.

In the present embodiment, filtering step 1006 results in the generation of a filtered set of files (i.e. those files that have been filtered in) and a removed set of files (i.e. those files that have been filtered out). The list of removed files is maintained so that if desired metadata with respect to those files can still be indexed and searched (even though the file content is not). In alternative embodiments, however, files that are removed may simply be ignored (in which case no excluded file list needs to be maintained).

Depending on implementation, filtering at 1006 may be performed by either the SCM system 102 or by the synchronization system 104.

For example, the synchronization system 104 may perform the filtering. In this case the content request to the SCM system 102 simply requires the SCM system 102 to identify and send to the synchronization system 104 all files that have changed between the start and end states. At 1006 the synchronization system 104 (e.g. the content acquisition module 308) receives the files from the SCM system 102 and applies the required filters. This approach has the advantage that no special configuration/programming of the SCM system 102 is required.

Alternatively, the SCM system 102 may perform the filtering. In this case the content request sent to the SCM system 102 may include (or the SCM system may store) the filter field including filter information defining the filters to be applied. At 1006 the SCM system 102 both identifies the relevant files and performs filtering. This approach can be advantageous as if a file is filtered out the content of the file (at least) does not need to be communicated from the SCM system 102 to the synchronization system 106.

If filtering is performed by the SCM system 102, relevant data in respect of the files is sent from the SCM system 102 to the synchronization system 104 at 1008. In the present embodiment, relevant data for the filtered files is the actual file content and file metadata. Relevant data for the removed files is the file metadata only.

At step 1010, any required content transformations are performed. The synchronization system (e.g. the content adapter 309) may be configured to perform various content transformations in order to improve searching once the content has been indexed. Some example transformations are described below.

In one example, the content adapter 309 may be configured to encode the file contents in UTF-8 and/or add line numbers to the source code file content received from the SCM system 102. This is done so that when the search engine system 106 retrieves a string of text around a matched search term, it can retrieve a string that starts from the beginning of a new line. To allow for this, the content adapter module 309 scans the source code content retrieved from the SCM system 102 for line endings, calculates incrementing line numbers, and prefixes the incrementing line numbers for each line ending identified. The transformed source code content is subsequently reassembled into a single string to be added to a batch file.

Once any content transformations have been performed, the transformed content and associated file metadata are forwarded to the indexing module 306.

At step 1012, the indexing module 306 generates file descriptors for each file that is to be sent to the search engine system 106. The file descriptor for an included file (i.e., filtered file) is generated to include both a content field including file content (transformed or otherwise) and metadata fields including file metadata (e.g. the repository ID, the project ID, whether the file is public or private, the file extension, the file path, and the file size). In some embodiments, file descriptors for excluded files may also be generated, though only to include only the file metadata. In other embodiments no file descriptors are generated for excluded files Once generated, and as described with reference to FIG. 7, the file descriptors are batched and sent to the search engine system 106 for indexing.

Search Improvement

Repository data is synchronized between the SCM system 102 and the search engine system 106 so that users can perform searches on the synchronized content. Users may wish to search the content based on a full-text search or a metadata search.

To enable full-text searching, the search engine system 106 creates an inverted index. The inverted index consists of a list of all the unique words that appear in any file descriptor stored in the database 120, and for each word, a list of the file descriptors in which it appears.

In order to tokenize a block of text into individual terms suitable for use in the inverted index and to normalize these terms into a standard form to improve their searchability, the search engine system 106 may utilize an analyzer.

Figure 11:
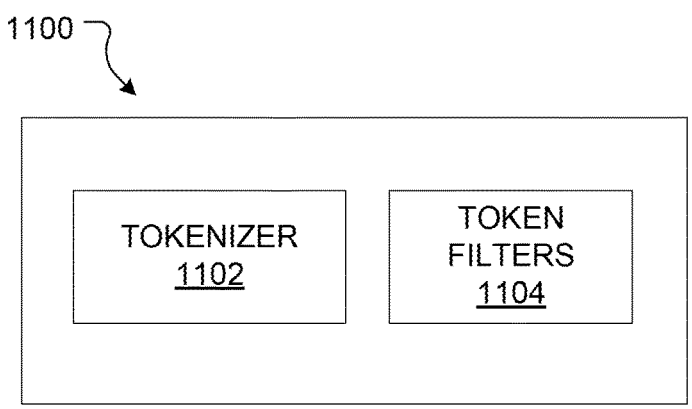
FIG. 11 is a block diagram of an example analyzer for tokenizing and normalizing content for indexing.

FIG. 11 illustrates an analyzer 1100 according to some aspects of the present disclosure. The analyzer 1100 is configured to improve searchability of the content stored in the search engine system 106.

The analyzer 1100 includes a tokenizer 1102 that is configured to tokenize strings into individual terms. For example, the tokenizer 1102 is configured break up a string into individual terms or words based on whitespace or punctuation marks such as a comma, semi-colon, or period etc.

The analyzer 1100 also includes one or more token filters 1104, which are configured to change terms, remove terms, or add terms. A number of different token filters are described below by way of example, A lowercase token filter may be provided which is configured to change all uppercase letters into lower case letters for the inverted index. If a similar token filter is used for search strings this renders searches case insensitive.

A common character/word token filter may be provided which is configured to prevent single characters (such as I, A, etc.) and common words (e.g. the) from being included in the inverted index. This is on the basis that searches for such words would result in too many results to be useful in any event.

A line number token filter may be provided that is configured to prevent line numbers from content from being included in the inverted index. The line numbers are removed so that a search for a particular number (e.g. "3") does not hit/return every source code file with 3 or more lines.

Source code may include descriptors/terms written in certain coding conventions. One example of such a convention is 'camel case' where compound words or phrases are written such that each word or abbreviation in the middle of the phrase begins with a capital letter. Camel case may start with a capital letter or with a lowercase letter. An example of camel case may be the term "riotPolice". Another example of such a convention is 'kebab case', where compound words/phrases are written separated by a hyphen—e.g. 'riot-police'. A further example of such a convention is 'snake case', where compound words/phrases are written separated by an underscore—e.g. 'riot_police'.

In order to account for such conventions special handling is required. For example, under normal processing a search for "Riot police" or "Riot AND police" may not identify one or more of the terms 'riotPolice' or 'riot-police' or 'riot_police' as these were considered one word by the tokenizer.

To account for this, the analyzer 1100 includes a number of convention token filters—e.g. a camel case token filter, a kebab-case token filter and/or a snake case token filter.

A camel case token filter may be configured to identify a camel case word if it encounters a word that has one or more capital letters in the middle of a continuous string of alpha-numeric characters (i.e. letters/number without spaces). When such words are encountered, the camel case token filter adds multiple terms to the inverse index for the camel case term. For example, if the term abstractRiot was encountered, the camel case token filter would add the terms abstract, riot, and abstractriot to the inverted index. Similarly, abstractRiotPolice was encountered, the camel case token filter may add the terms abstractriot, abstractriotpolice, riotpolice, abstract, riot, and police to the inverted index.

A kebab case token filter may be configured to identify a kebab case word if it encounters a continuous string of alpha-numeric characters that includes one or more hyphens. In this case, and similar to the camel case token filter described above, the kebab case token filter can add appropriate terms to the inverted index. For example, if the term abstract-riot was encountered, the kebab case token filter would add the terms abstract, riot, abstractriot, and abstract-riot to the inverted index.

A snake case token filter may be configured to identify a snake case word if it encounters a continuous string of alpha-numeric characters that includes one or more underscores. In this case, and similar to the camel case token filter described above, the snake case token filter can add appropriate terms to the inverted index. For example, if the term abstract_riot was encountered, the kebab case token filter would add the terms abstract, riot, abstractriot, and abstract_riot to the inverted index.

Once the analyzer is configured, the various tokenizing and filtering rules are applied to the incoming file content.

An analyzer can also be used for search queries that are generated by users. For example, the case of the terms in the search string can be changed to lower case, punctuation can be removed, etc.

In some cases the analyzer applied to a search query may apply different tokenizing or filtering rules. This may be appropriate, for example, when coding conventions such as those described above are encountered in a search string (e.g. a search string includes camel case, snake case, or kebab case terms).

As noted above, when a term such as 'riotPolice' is being indexed a token filter acts to add the words riot, police, and riotpolice to the inverted index. When a term such as 'riotPolice' is encountered in a search term, however, the analyzer may for example add the phrases "riot police", "riot-police", "riotpolice" and "riot_police". This is done in order to retrieve results in which the words riot and police are next to each other, but not to return results where the word riot or police are used separately.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer implemented method for updating a search engine (SE) version of a repository corresponding to a source code management (SCM) version of the repository, the method comprising:
   maintaining, by a SCM system, the SCM version of the repository, the SCM version of the repository comprising one or more source code files shared with a local repository maintained by a SCM client;
   maintaining, by a search engine system, the SE version of the repository, the SE version of the repository comprising one or more indexed source code files;
   determining that the SCM version of the repository has changed;
   identifying a repository identifier of the changed repository;
   generating an indexed state query using the repository identifier and communicating the indexed state query to the search engine system;
   in response to the indexed state query, receiving an index state descriptor comprising indexed state information defining an indexed state of the SE version of the repository;
   generating an SCM state query using the repository identifier and communicating the SCM state query to the SCM system;
   in response to the SCM state query, receiving SCM state information, the SCM state information defining an SCM state of the SCM version of the repository at the time the SCM state query is handled by the SCM system;
   comparing the indexed state information and the SCM state information to determine whether updating the SE version of the repository is required;
   in response to determining that updating the SE version of the repository is required performing an indexing process comprising:
      identifying one or more source code files in the SCM version of the repository that have been modified between the indexed state and the SCM state;
      extracting content from at least one of the one or more modified source code files;
      wherein extracting the content from the at least one of the one or more modified source code files comprises identifying one or more filters to be applied to the one or more modified source code files based on the one or more modified source code files; selecting a particular system from among a plurality of systems comprising the SCM system and a synchronization system; filtering, at the selected particular system, the one or more modified source code files using the identified one or more filters to generate a filtered set; and
      transmitting the extracted content to the search engine system for storage thereon; and
   upon completion of the indexing process, updating the index state descriptor on the search engine system to record the SCM state information as the indexed state information.

2. The method of claim 1, wherein the indexing process further comprises:
   updating the index state descriptor on the search engine system to record the SCM state information as target state information; and
   if the indexing process completes successfully, updating the index state descriptor on the search engine system to clear the target state information in the index state descriptor.

3. The method of claim 1, further comprising:
   in response to determining that updating the SE version of the repository is required:
      inspecting the index state descriptor to determine if target state information is present, the target state information indicating that a previous attempt at updating the SE version of the repository failed; and
      in response to determining that the target state information is present, performing an aborted indexing process, the aborted indexing process reattempting to update the SE version of the repository to the target state indicated by the target state information.

4. The method of claim 3, wherein the aborted indexing process comprises:
   identifying one or more files in the SCM version of the repository that have been modified between the indexed state and target state;
   extracting content from at least one of the one or more modified files;
   transmitting the extracted content to the search engine system for storage thereon; and
   updating the index state descriptor in the search engine system to record the target state as the indexed state and delete the target state information.

5. The method of claim 3, wherein if the aborted indexing process fails, the aborted indexing process is retried a predetermined number of times.

6. The method of claim 5, wherein in response to the aborted indexing process failing the predetermined number of times, deleting the SE version of the repository.

7. The method of claim 1, wherein the index state descriptor further includes lock information indicating whether the SE version of the repository is locked for editing or unlocked, and the method further comprising:
   inspecting the lock information; and
   in the event that the lock information indicates that the SE version of the repository is locked for editing, repeating the method for updating the SE version of the repository after a predetermined period.

8. The method of claim 1, wherein:
   determining that the change has been made to the SCM version of the repository comprises receiving a notification triggered by the SCM system, indicating that the SCM version of the repository has changed, and
   identifying the repository identifier comprises inspecting the notification.

9. The method of claim 1, wherein:
   in response to the indexed state query, receiving a notification that a SE version of the repository does not exist,
   determining that adding the SE version of the repository is required;
   performing a new indexing process comprising:
      identifying all files in the SCM version of the repository;
      extracting content from one or more of the identified files;
      transmitting the extracted content to the search engine system for storage thereon in the SE version of the repository;
      creating the index state descriptor for the SE version of the repository including indexed state information, wherein the SCM state information is recorded as the indexed state information; and transmitting the index state descriptor to the search engine system for storing.

10. The method of claim 1, wherein the SCM repository comprises a plurality of branches and wherein the indexing process is only performed on a default branch of the plurality of branches.

11. The computer implemented method of claim 1, wherein the one or more filters comprise a file size filter, a file type filter, a status filter, or a file permission filter.

12. A system for updating a search engine (SE) version of a repository corresponding to a source code management (SCM) version of the repository, the system comprising:
a processor,
a communication interface, and
a non-transitory computer-readable storage medium storing sequences of instructions,
which when executed by the processor, cause the processor to:
maintain, by a SCM system, the SCM version of the repository, the SCM version of the repository comprising one or more source code files shared with a local repository maintained by a SCM client;
maintain, by a search engine system, the SE version of the repository, the SE version of the repository comprising one or more indexed source code files;
determine that the SCM version of the repository has changed;
identify a repository identifier of the changed repository;
generate an indexed state query using the repository identifier and communicate the indexed state query, via the communication interface, to the search engine system;
in response to the indexed state query, receive, via the communication interface, an index state descriptor comprising indexed state information defining an indexed state of the SE version of the repository;
generate an SCM state query using the repository identifier and communicate the SCM state query, via the communication interface, to the SCM system;
in response to the SCM state query, receive SCM state information via the communication interface, the SCM state information defining an SCM state of the SCM version of the repository at the time the SCM state query is handled by the SCM system;
compare the indexed state information and the SCM state information to determine whether updating the SE version of the repository is required;
in response to determining that updating the SE version of the repository is required:
identify one or more source code files in the SCM version of the repository that have been modified between the indexed state and the SCM state;
extract content from at least one of the one or more modified source code files; wherein extracting the content from the at least one of the one or more modified source code files comprises identifying one or more filters to be applied to the one or more modified source code files based on the one or more modified source code files; selecting a particular system from among a plurality of systems comprising the SCM system and a synchronization system; filtering, at the selected particular system, the one or more modified source code files using the identified one or more filters to generate a filtered set; and transmit the extracted content to the search engine system for storage thereon; and
upon completion of the indexing process, updating the index state descriptor on the search engine system to record the SCM state information as the indexed state information.

13. The system of claim 12, wherein the processor is further configured to execute instructions which cause the processor to:
update the index state descriptor on the search engine system to record the SCM state information as target state information; and
if the indexing process completes successfully, update the index state descriptor on the search engine system to clear the target state information in the index state descriptor.

14. The system of claim 12, wherein the processor is further configured to execute instructions which cause the processor to:
in response to determining that updating the SE version of the repository is required, inspect the index state descriptor to determine if target state information is present, the target state information indicating that a previous attempt at updating the SE version of the repository failed; and
in response to determining that the target state information is present, perform an aborted indexing process, the aborted indexing process reattempting to update the SE version of the repository to the target state indicated by the target state information.

15. The system of claim 14, wherein the aborted indexing process comprises:
identifying one or more files in the SCM version of the repository that have been modified between the indexed state and target state;
extracting content from at least one of the one or more modified files;
transmitting the extracted content to the search engine system for storage thereon; and
updating the index state descriptor in the search engine system to record the target state as the indexed state and delete the target state information.

16. The system of claim 15, wherein if the aborted indexing process fails, the processor is configured to execute instructions that cause the processor to retry the aborted indexing process a predetermined number of times.

17. The system of claim 16, wherein in response to the aborted indexing process failing the predetermined number of times, the processor executing a sequence of instructions causing the processor to request the search engine system, via the communication interface, to delete the SE version of the repository.

18. The system of claim 13, wherein the index state descriptor further includes lock information indicating whether the SE version of the repository is locked for editing or unlocked, and
the processor executing a sequence of instructions causing the processor to:
inspect the lock information; and
in the event that the lock information indicates that the SE version of the repository is locked for editing, retry to update the SE version of the repository after a predetermined period.

19. The system of claim 13, wherein the processor executes instructions that cause the system to:
determine that the change has been made to the SCM version of the repository comprises receiving a notification triggered by the SCM system, indicating that the SCM version of the repository has changed, and identify the repository identifier comprises inspecting the notification.

20. The system of claim 13, wherein the processor executes instructions that cause the system to:

receive, via the communication interface, a notification triggered by the SCM system, the notification indicating that the SCM version of the repository has changed, and inspect the notification to identify the repository identifier.

21. The system of claim 13, wherein, in response to the indexed state query, the processor executes a sequence of instructions causing the system to receive, via the communication interface, a notification that the SE version of the repository does not exist, and wherein the processor executes a sequence of instructions causing the processor to:

determine that adding the SE version of the repository is required;

performing a new indexing process comprising:

identifying all files in the SCM version of the repository;

extracting content from one or more of the identified files; and transmitting the extracted content to the search engine system for storage thereon in the SE version of the repository;

create the index state descriptor for the SE version of the repository including indexed state information, wherein the SCM state information is recorded as the indexed state information; and transmit the index state descriptor to the search engine system for storing.

22. The system of claim 12, wherein the SCM repository comprises a plurality of branches and wherein the indexing process is only performed on a default branch of the plurality of branches.

23. Non-transient computer readable storage comprising instructions which, when executed by a processor, cause the processor to update a search engine (SE) version of a repository corresponding to a source code management (SCM) version of the repository, the instructions comprising instructions to:

maintain, by a SCM system, the SCM version of the repository, the SCM version of the repository comprising one or more source code files shared with a local repository maintained by a SCM client;

maintain, by a search engine system, the SE version of the repository, the SE version of the repository comprising one or more indexed source code files;

determine that the SCM version of the repository has changed;

identify a repository identifier of the changed repository;

generate an indexed state query using the repository identifier and communicate the indexed state query, via the communication interface, to the search engine system;

in response to the indexed state query, receive, via the communication interface, an index state descriptor comprising indexed state information defining an indexed state of the SE version of the repository;

generate an SCM state query using the repository identifier and communicate the SCM state query, via the communication interface, to the SCM system;

in response to the SCM state query, receive SCM state information via the communication interface, the SCM state information defining an SCM state of the SCM version of the repository at the time the SCM state query is handled by the SCM system;

compare the indexed state information and the SCM state information to determine whether updating the SE version of the repository is required;

in response to determining that updating the SE version of the repository is required:

identify one or more source code files in the SCM version of the repository that have been modified between the indexed state and the SCM state;

extract content from at least one of the one or more modified source code files;

wherein extracting the content from the at least one of the one or more modified source code files comprises: identifying one or more filters to be applied to the one or more modified source code files based on the one or more modified source code files; selecting a particular system from among a plurality of systems comprising the SCM system and a synchronization system; filtering, at the selected particular system, the one or more modified source code files using the identified one or more filters to generate a filtered set; and transmit the extracted content to the search engine system for storage thereon; and upon completion of the indexing process, updating the index state descriptor on the search engine system to record the SCM state information as the indexed state information.

* * * * *